United States Patent
Mishima et al.

(10) Patent No.: US 11,651,504 B2
(45) Date of Patent: May 16, 2023

(54) LEARNING METHOD, STORAGE MEDIUM AND IMAGE PROCESSING DEVICE

(71) Applicant: KABUSHIKI KAISHA TOSHIBA, Tokyo (JP)

(72) Inventors: Nao Mishima, Tokyo (JP); Naoki Nishizawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 82 days.

(21) Appl. No.: 17/466,794

(22) Filed: Sep. 3, 2021

(65) Prior Publication Data

US 2022/0301210 A1 Sep. 22, 2022

(30) Foreign Application Priority Data

Mar. 16, 2021 (JP) .............................. JP2021-042736

(51) Int. Cl.
*G06K 9/00* (2022.01)
*G06T 7/571* (2017.01)

(52) U.S. Cl.
CPC .... *G06T 7/571* (2017.01); *G06T 2207/20081* (2013.01)

(58) Field of Classification Search
CPC .. G06T 7/571; G06T 2207/20081; G06N 3/00
See application file for complete search history.

(56) References Cited

U.S. PATENT DOCUMENTS

| | | | | |
|---|---|---|---|---|
| 11,449,968 | B2* | 9/2022 | Lin | G06T 7/215 |
| 2012/0044400 | A1* | 2/2012 | Okada | H04N 5/23232 |
| | | | | 348/E5.045 |
| 2014/0009634 | A1* | 1/2014 | Hiwada | H04N 5/225 |
| | | | | 348/222.1 |
| 2019/0080481 | A1 | 3/2019 | Yamaguchi et al. | |
| 2020/0051264 | A1 | 2/2020 | Mishima et al. | |
| 2020/0294260 | A1 | 9/2020 | Kashiwagi et al. | |
| 2020/0394759 | A1* | 12/2020 | Luo | G06T 7/85 |
| 2021/0073953 | A1* | 3/2021 | Lee | G06T 7/571 |
| 2021/0082146 | A1 | 3/2021 | Kashiwagi et al. | |

(Continued)

FOREIGN PATENT DOCUMENTS

| | | |
|---|---|---|
| JP | 2013-25649 A | 2/2013 |
| JP | 2019-49457 A | 3/2019 |

(Continued)

OTHER PUBLICATIONS

S. Agarwal, et al., "Building Rome in a Day," Communications of the ACM, vol. 54, No. 10, pp. 105-112 (2011).

(Continued)

*Primary Examiner* — Shervin K Nakhjavan
(74) *Attorney, Agent, or Firm* — Finnegan, Henderson, Farabow, Garrett & Dunner, LLP

(57) ABSTRACT

According to one embodiment, a learning method for causing a statistical model to learn is provided. The statistical model is generated by learning a bokeh caused in a first image captured in a first domain in accordance with a distance to a first subject included in the first image, the method includes acquiring a plurality of second images by capturing a second subject from multiple viewpoints in a second domain other than the first domain, and causing the statistical model to learn using the second images.

10 Claims, 12 Drawing Sheets

(56) References Cited

U.S. PATENT DOCUMENTS

| | | | |
|---|---|---|---|
| 2021/0312233 A1 | 10/2021 | Mishima et al. | |
| 2021/0319537 A1* | 10/2021 | Hiasa | G06V 10/82 |
| 2022/0036513 A1* | 2/2022 | Luo | G06N 3/0481 |

FOREIGN PATENT DOCUMENTS

| | | |
|---|---|---|
| JP | 2020-26990 A | 2/2020 |
| JP | 2020-148483 A | 9/2020 |
| JP | 2021-43115 A | 3/2021 |
| JP | 2021-165944 A | 10/2021 |

OTHER PUBLICATIONS

M.A. Branch, et al., "A Subspace, Interior, and Conjugate Gradient Method for Large-Scale Bound-Constrained Minimization Problems," SIAM J. on Scientific Computing, vol. 21, No. 1, 30 pages (1999).

Y. Furukawa et al., "Accurate, Dense, and Robust Multiview Stereopsis," IEEE Transactions on Pattern Analysis and Machine Intelligence, vol. 32, No. 8, pp. 1362-1376 (2010).

M. Kashiwagi et al., "Deep Depth From Aberration Map," 2019 IEEE/CVF Int'l Conf. on Computer Vision (ICCV), pp. 4070-4079 (2019).

Nao Mishima et al., "Physical Cue based Depth-Sensing by Color Coding with Deaberration Network," BMVC, 13 pages, https://bmvc2019.org/wp-content/uploads/papers/0156-paper.pdf (2019).

J.J. Moré, "The Levenberg-Marquardt algorithm: Implementation and theory," In: Watson G. A. (eds), Numerical Analysis—Lecture Notes in Mathematics, vol. 630, 16 pages, (1978).

B. Triggs, et al., "Bundle Adjustment—A Modern Synthesis," Proc, of the Int'l Workshop on Vision Algorithms: Theory and Practice, 71 pages (1999).

O. YILMAZ, Figure 2, https://www.researchgate.net/figure/Structure-from-Motion-SfM-process-is-illustrated-The-structure-in-the_fig2_269327935, 1 page (2013).

T. Zhou et al., "Unsupervised Learning of Depth and Ego-Motion from Video," 2017 IEEE Conf. on Computer Vision and Pattern Recognition (CVPR), pp. 1851-1860 (2017).

* cited by examiner

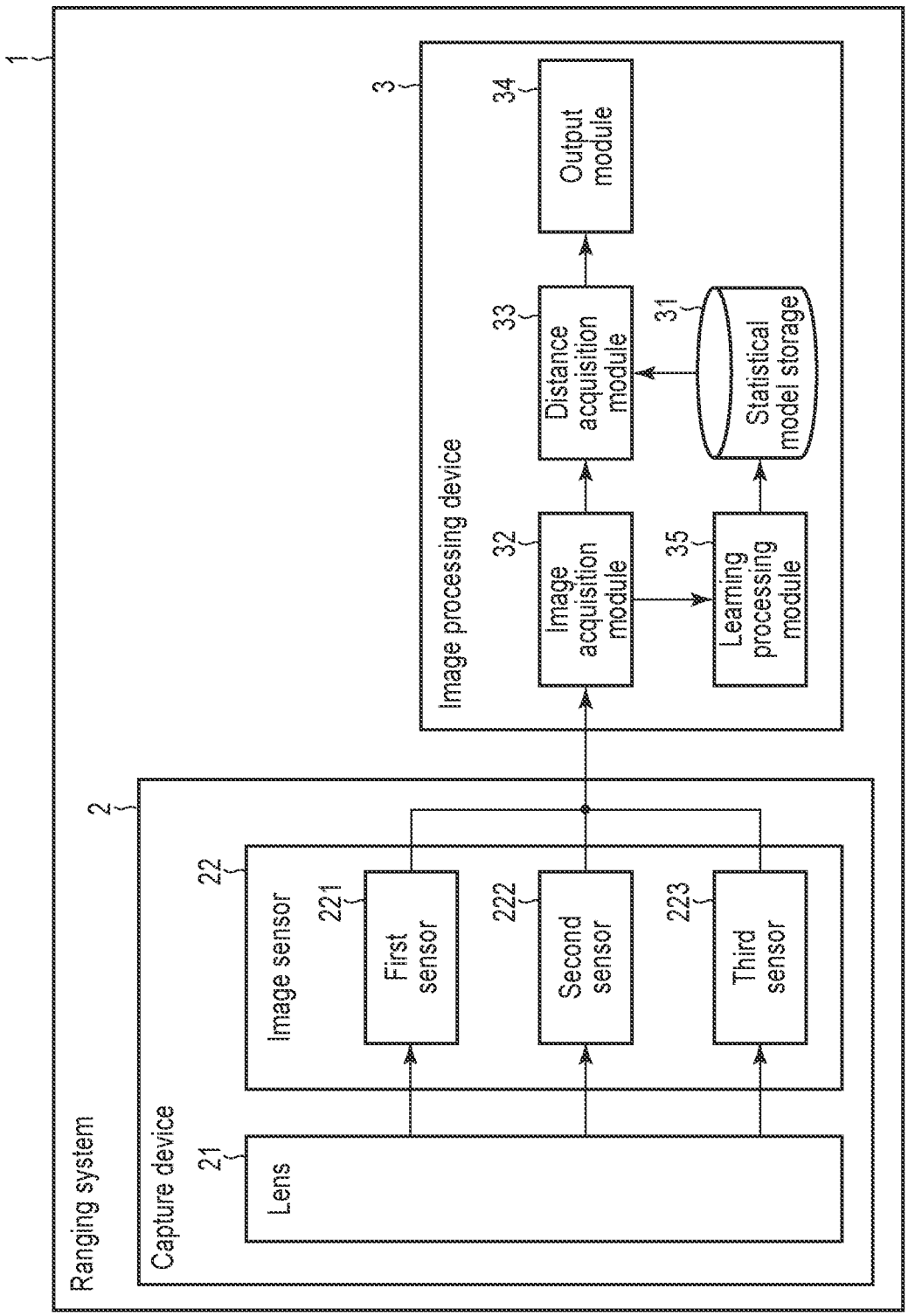
F I G. 1

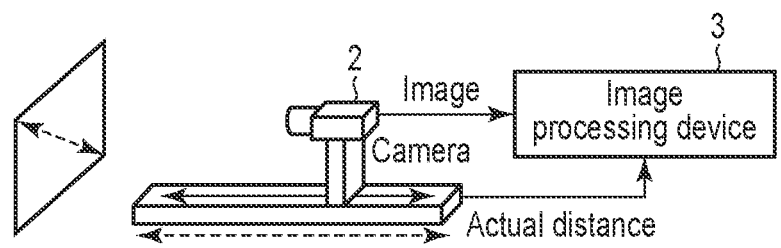
F I G. 9
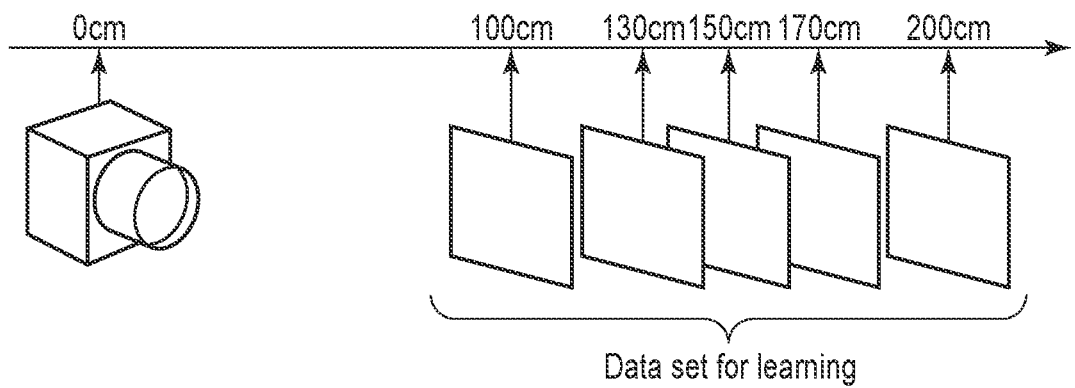
F I G. 10

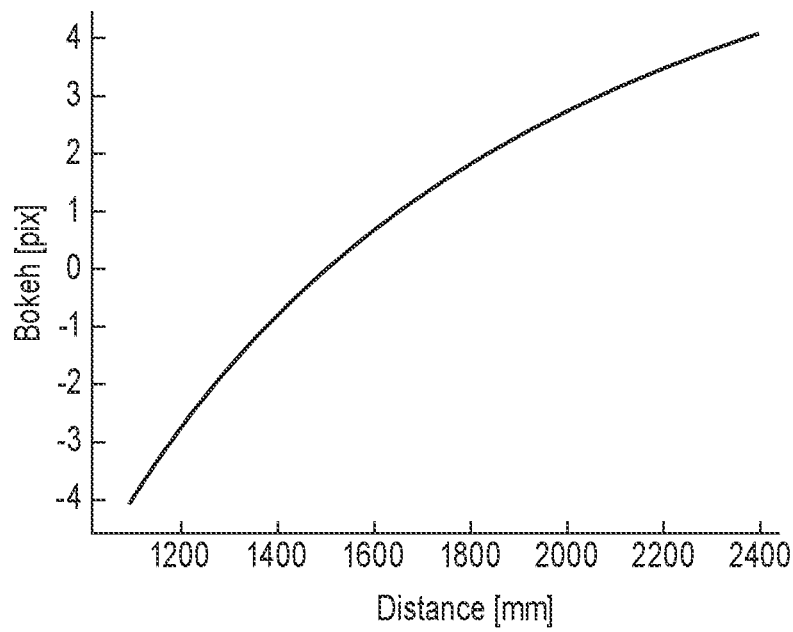
F I G. 13
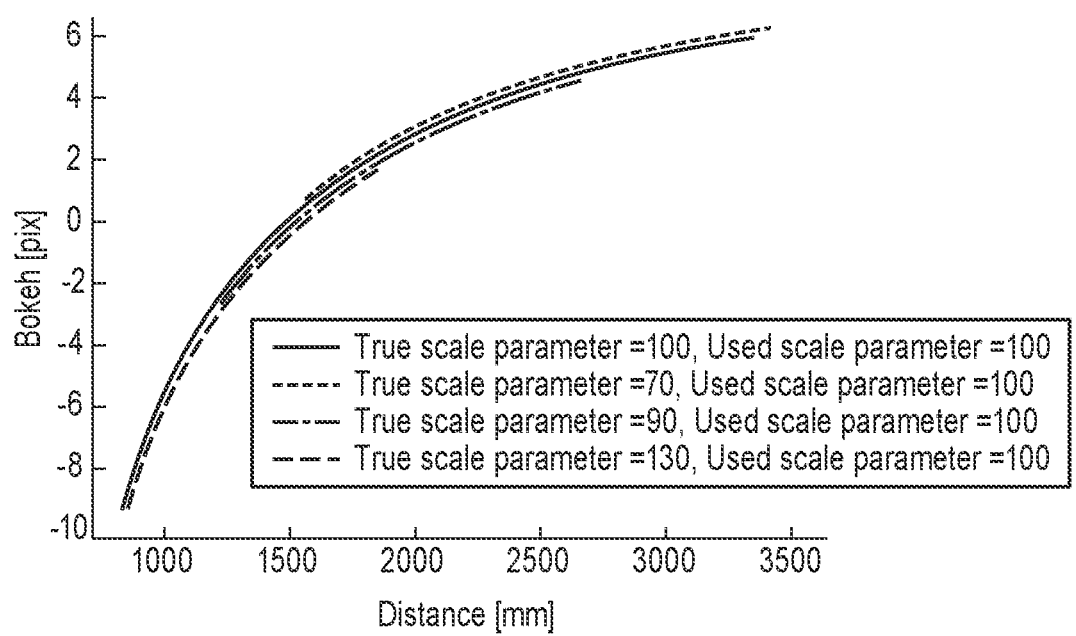
F I G. 14

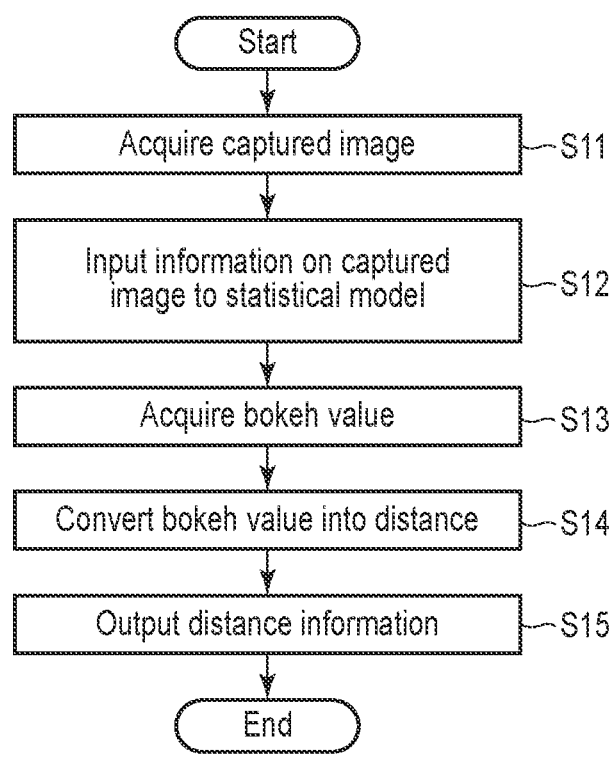
F I G. 21

LEARNING METHOD, STORAGE MEDIUM AND IMAGE PROCESSING DEVICE

CROSS-REFERENCE TO RELATED APPLICATIONS

This application is based upon and claims the benefit of priority from Japanese Patent Application No. 2021-042736, filed Mar. 16, 2021, the entire contents of which are incorporated herein by reference.

FIELD

Embodiments described herein relate generally to a learning method, a storage medium and an image processing device.

BACKGROUND

In order to obtain the distance to a subject, it has been known to use images captured by two capture devices (cameras) and a stereo camera (compound-eye camera). In recent years, a technology has been developed to obtain the distance to a subject using images captured by one capture device (monocular camera).

In order to obtain the distance to a subject using images as described above, it is conceivable to use a statistical model generated by applying a machine learning algorithm such as a neural network.

In order to generate a high-accuracy statistical model, however, it is necessary to cause the statistical model to learn an enormous data set (a set of a learning image and a correct value concerning the distance to a subject in the learning image), but it is not easy to prepare the data set.

BRIEF DESCRIPTION OF THE DRAWINGS

FIG. 1 is a block diagram showing an example of a configuration of a ranging system according to a first embodiment.

FIG. 9 is an illustration of a data set for learning.

FIG. 10 is an illustration of a data set for learning.

FIG. 13 is a graph showing an example of a correspondence between a bokeh and a distance calculated using a true scale parameter.

FIG. 14 is a graph showing an example of a correspondence using a scale parameter with errors.

FIG. 21 is a flowchart showing an example of a process to be performed by the image processing device when distance information is obtained from a captured image.

DETAILED DESCRIPTION

Figure 2:
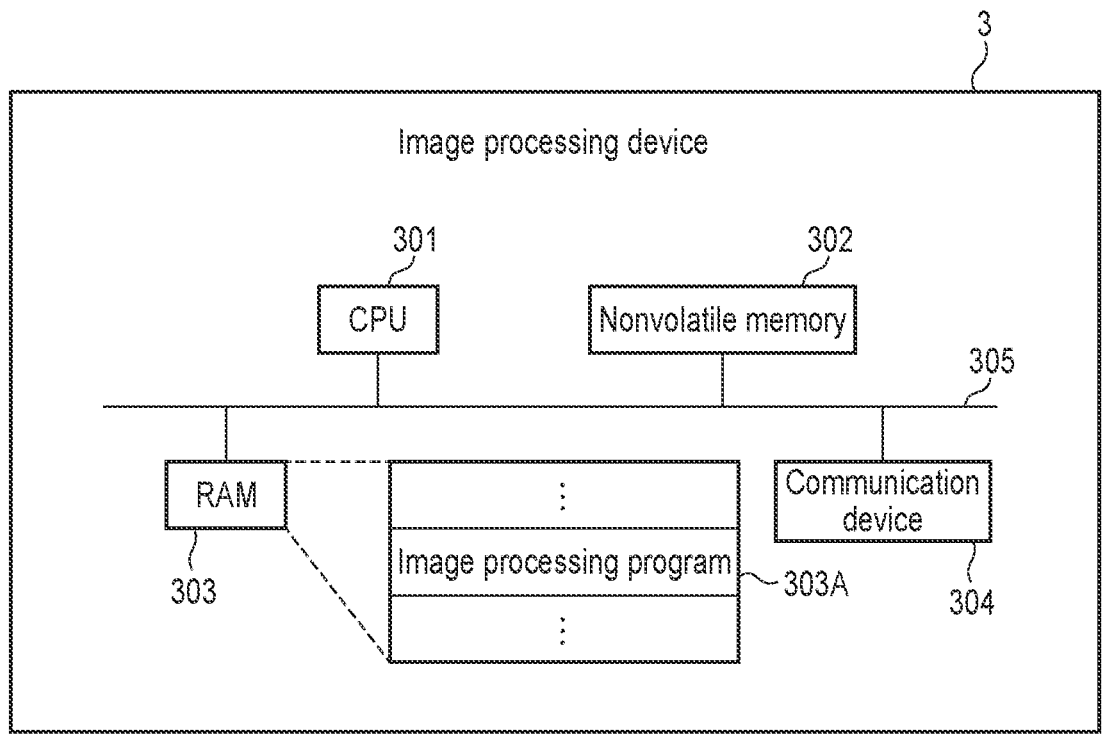
FIG. 2 is a block diagram showing an example of a system configuration of an image processing device.

In general, according to one embodiment, a learning method for causing a statistical model to learn is provided. The statistical model is generated by learning a bokeh caused in a first image captured in a first domain in accordance with a distance to a first subject included in the first image, the method includes acquiring a plurality of second images by capturing a second subject from multiple viewpoints in a second domain other than the first domain, and causing the statistical model to learn using the second images.

Embodiments will be described below with reference to the drawings.

First Embodiment

FIG. 1 shows an example of a configuration of a ranging system 1 according to a first embodiment. The ranging system 1 is used to capture an image to obtain (measure) the distance from a capturing point to a subject using the captured image.

As shown in FIG. 1, the ranging system 1 includes a capture device 2 and an image processing device 3. In the first embodiment, the ranging system 1 includes the capture device 2 and image processing device 3 which are separate devices, but the ranging system 1 may be implemented as one device (ranging device) in which the capture device 2 functions as a capture unit and the image processing device 3 functions as an image processing unit. The image processing device 3 may operate as a server that executes various cloud computing services, for example.

The capture device 2 is used to capture a variety of images. The capture device 2 includes a lens 21 and an image sensor 22. The lens 21 and image sensor 22 correspond to an optical system (monocular camera) of the capture device 2.

Light reflected by a subject strikes on the lens 21. The light is transmitted through the lens 21. Then, the light is received (detected) by the image sensor 22. The image sensor 22 converts the received light into an electric signal (photoelectric conversion) to generate an image including a plurality of pixels.

Note that the image sensor 22 is implemented by, for example, a charge coupled device (CCD) image sensor and a complementary metal oxide semiconductor (CMOS) image sensor. The image sensor 22 includes, for example, a first sensor (R sensor) 221 that senses light in a red (R) wavelength band, a second sensor (G sensor) 222 that senses light in a green (G) wavelength band, and a third sensor (B sensor) 223 that senses light in a blue (B) wavelength band. The first to third sensors 221 to 223 receive light in their corresponding wavelength bands to generate sensor images (R, G and B image) corresponding to the wavelength bands (color components). That is, the images captured by the image device 2 are color images (RGB images) and include the R, G and B images.

In the first embodiment, the image sensor 22 includes the first to third sensors 221 to 223, but it has only to include at least one of the first to third sensors 221 to 223. The image sensor 22 may also include, for example, a sensor that generates a monochrome image in place of the first to third sensors 221 to 223.

In the first embodiment, the image formed based on the light transmitted through the lens 21 is an image influenced by aberration of the optical system (lens 21), and includes a bokeh caused by the aberration.

The image processing device 3 shown in FIG. 1 includes, as functional components, statistical model storage 31, an image acquisition module 32, a distance acquisition module 33, an output module 34 and a learning processing module 35.

The statistical model storage 31 stores a statistical model used to obtain the distance to a subject from an image captured by the capture device 2. The statistical model stored in the statistical model storage 31 is generated by learning a bokeh that varies nonlinearly in accordance with the distance to the subject in the image influenced by the aberration of the optical system described above. When an image is input to the statistical model, a bokeh value indicating a bokeh caused in the image can be predicted (output) in accordance with the distance to a subject included in the image, as a prediction value corresponding to the image.

Assume that the statistical model can be generated by applying a variety of known machine learning algorithms such as a neural network and a random forest. The neural network applicable to the first embodiment may include a convolutional neural network (CNN), a fully-connected neural network, a recurrent neural network, and the like.

The image acquisition module 32 acquires the image captured by the capture device 2, from the capture device 2 (image sensor 22).

The distance acquisition module 33 uses the image acquired by the image acquisition module 32 to acquire distance information indicating the distance to the subject in the image. In this case, the distance acquisition module 33 inputs the image to the statistical model stored in the statistical model storage 31 to acquire the distance to the subject, based on a bokeh value output from the statistical model (a bokeh value indicating a bokeh caused in the image in accordance with the distance to the subject included in the image).

The output module 34 outputs the distance information acquired by the distance acquisition module 33, for example, in the form of a map to correspond in position to the image. In this case, the output module 34 can output image data including pixels having distances indicated by the distance information as pixel values (that is, the distance information is output as image data). When the distance information is output as image data, the image data can be displayed as a distance image indicating the distance in color, for example. The distance information output from the output module 34 can also be used, for example, to calculate the size of the subject in the image captured by the capture device 2.

The learning processing module 35 performs a process of learning the statistical model stored in the statistical model storage 31 using, for example, an image acquired by the image acquisition module 32. The process performed by the learning processing module 35 will be described in detail later.

In the example shown in FIG. 1, the image processing device 3 includes the modules 31 to 35, but it may be configured by, for example, a ranging device including the image acquisition section 32, distance acquisition module 33 and output module 34 and a learning device including the statistical model storage 31, image acquisition module 32 and learning processing module 35.

FIG. 2 shows an example of a system configuration of the image processing device 3 shown in FIG. 1. The image processing device 3 includes a CPU 301, a nonvolatile memory 302, a RAM 303 and a communication device 304. The image processing device 3 also includes a bus 305 which connects the CPU 301, nonvolatile memory 302, RAM 303 and communication device 304 to each other.

The CPU 301 is a processor to control the operation of various components in the image processing device 3. The CPU 301 may be a single processor or a plurality of processors. The CPU 301 executes various programs to be loaded from the nonvolatile memory 302 into the RAM 303. These programs include an operating system (OS) and various application programs. The application program includes an image processing program 303A.

The nonvolatile memory 302 is a storage medium used as an auxiliary storage device. The RAM 303 is a storage medium used as a main storage device. In FIG. 2, the image processing device 3 is shown to include only the nonvolatile memory 302 and RAM 303 as storage devices, but it may include other storage devices such as a hard disk drive (HDD) and a solid state drive (SDD).

In the first embodiment, the statistical model storage 31 shown in FIG. 1 is implemented by a nonvolatile memory 302, another storage device, or the like.

In the first embodiment, some or all of the image acquisition module 32, distance acquisition module 33, output module 34 and learning processing module 35 shown in FIG. 1 are implemented by causing the CPU 301 (that is, the computer of the image processing device 3) to execute the image processing program 303A, that is, by software. The image processing program 303A may be stored in a computer-readable storage medium for distribution or may be downloaded to the image processing device 3 via a network.

Although it has been described that the CPU 301 is caused to execute the image processing program 303A, some or all of the modules 32 to 35 may be implemented using, for example, a GPU (not shown) in place of the CPU 301. Some or all of the components 32 to 35 may also be implemented by hardware such as an integrated circuit (IC) or by the combination of software and hardware.

The communication device 304 is a device configured to perform wired or wireless communication. The communication device 304 includes a transmission unit that transmits a signal and a reception unit that receives a signal. The communication device 304 performs communication with an external device via a network, communication with an external device existing around the communication device 304, etc. The external device includes the capture device 2. In this case, the image processing device 3 can receive an image from the capture device 2 via the communication device 304.

Although not shown in FIG. 2, the image processing device 3 may further include an input device such as a mouse and a keyboard, and a display device.

Figure 3:
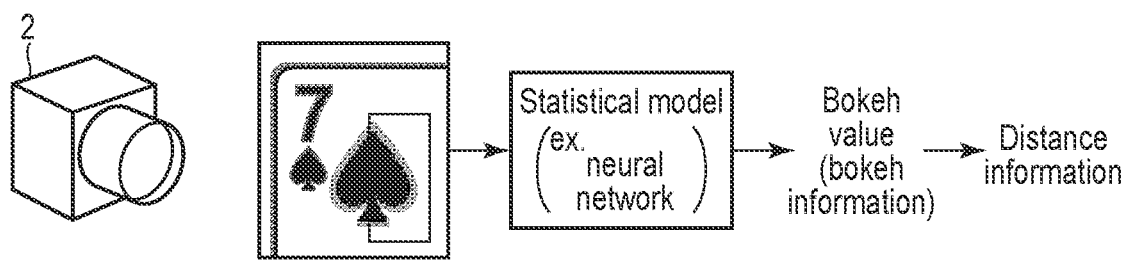
FIG. 3 is an illustration of an overview of the operation of the ranging system.

An overview of the operation of the ranging system 1 according to the first embodiment will be described below with reference to FIG. 3.

In the ranging system 1, the capture device 2 (image sensor 22) generates an image that is influenced by the aberration of the optical system (lens 21), as described above.

The image processing device 3 (image acquisition module 32) acquires an image generated by the capture device 2, and inputs the image to the statistical model stored in the statistical model storage 31.

According to the statistical model of the first embodiment, a bokeh value (bokeh information) indicating a bokeh generated in an input image is output in accordance with the distance to a subject in the input image, as described above. As will be described later, there is a correlation between the distance to the subject in an image and the color, size and shape of a bokeh generated in the image according to the distance. The image processing device 3 (distance acquisition module 33) can acquire distance information indicating the distance to the subject by converting the bokeh value output from the statistical model into the distance. In the first embodiment, the bokeh value output from the statistical model is a scalar quantity representing a bokeh amount including the color, size and shape of a bokeh generated in an image.

As described above, the first embodiment makes it possible to acquire distance information from the image captured by the capture device 2 using the statistical model.

The principle of acquiring the distance to a subject (distance information indicating the distance) in the first embodiment will be briefly described below with reference to FIG. 4.

The image captured by the capture device 2 (hereinafter referred to as a captured image) is blurred due to aberration (lens aberration) of the optical system of the capture device 2, as described above. Specifically, the refractive index of light that is transmitted through the lens 21 with aberration varies from wavelength band to wavelength band. Thus, for example, when the position of the subject (the position where the capture device 2 is focused on the subject) deviates from the focal position, the rays of the wavelength bands do not converge at one point but reach different points. This appears as a bokeh (chromatic aberration) on the image.

A bokeh (the color, size and shape thereof) which varies nonlinearly in accordance with the distance to the subject in the captured image (that is, the position of the subject with respect to the capture device 2) is observed.

Figure 4:
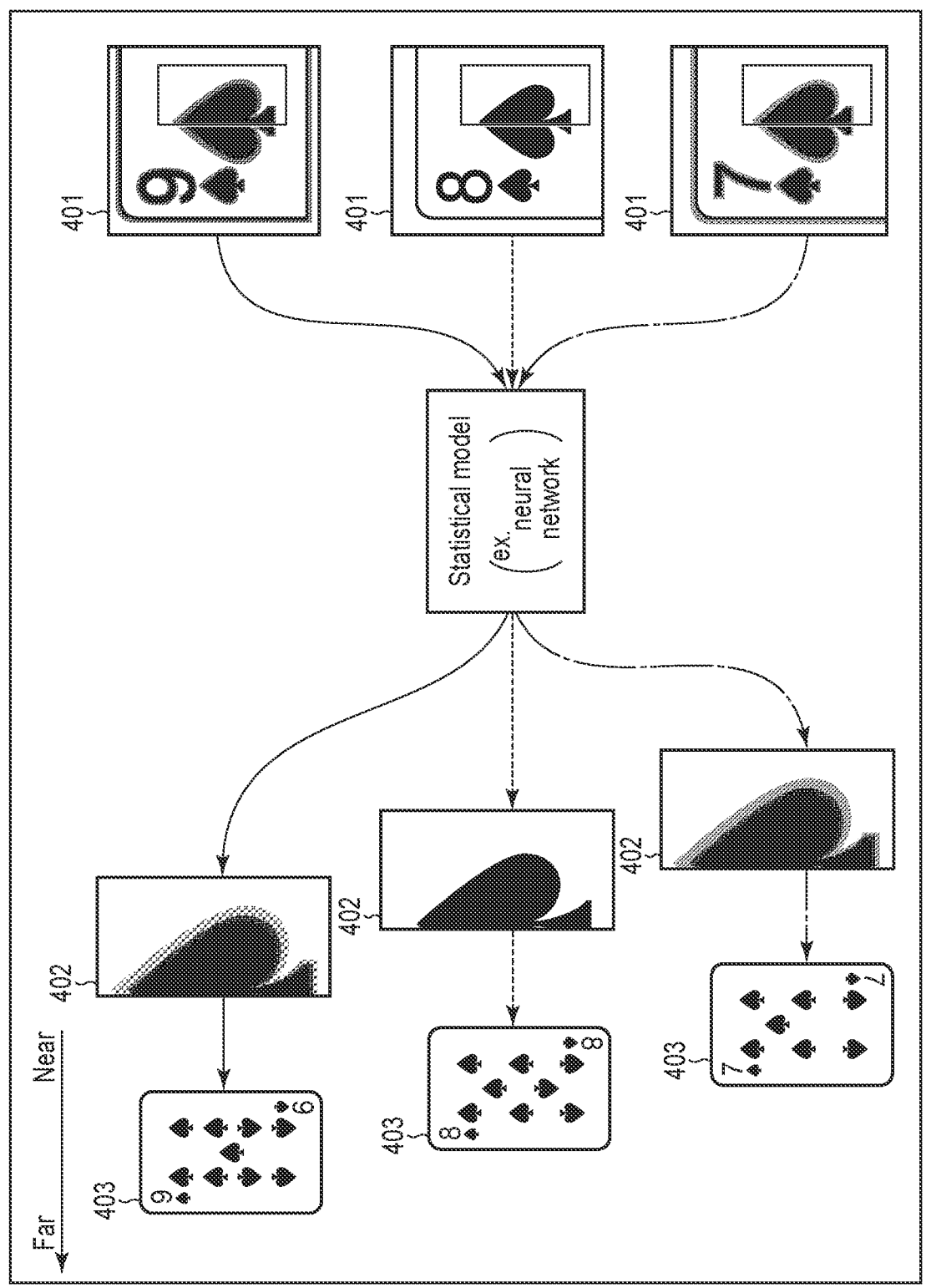
FIG. 4 is an illustration of the principle of obtaining the distance to a subject.

In the first embodiment, therefore, as shown in FIG. 4, a bokeh (bokeh value) 402 caused in a captured image 401 is analyzed by a statistical model as a physical clue to the distance to a subject 403 to obtain the distance to the subject 403.

Specifically, the bokeh 402 caused in the captured image 401 is estimated (predicted) when the captured image 401 is input to the statistical model. If the bokeh 402 is converted into the distance to the subject 403, the distance to the subject 403 in the captured image 401 can be acquired.

An example of a method for predicting a bokeh (a bokeh value indicating a bokeh) generated in accordance with the distance from the captured image to a subject in a statistical model, will be described below. Here is a description of a patch method and a screen batch method.

Figure 5:
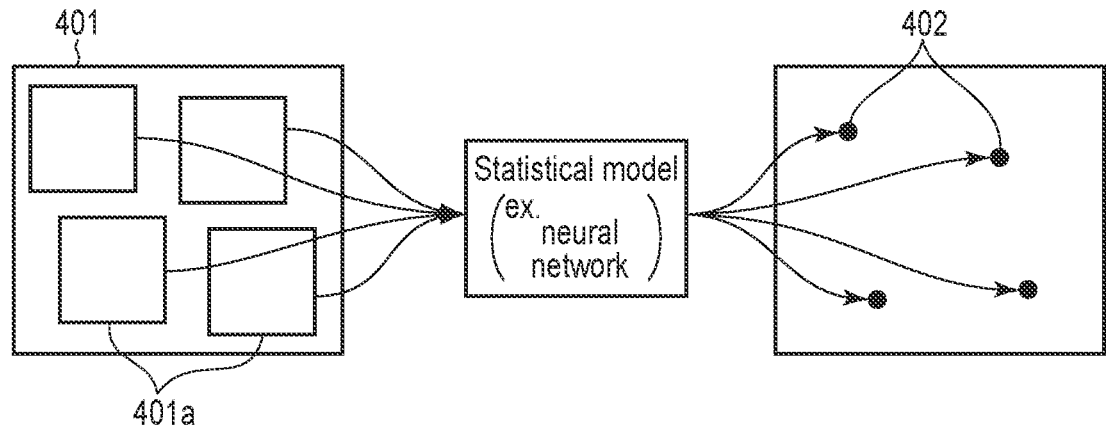
FIG. 5 is a diagram illustrating a patch method for predicting a bokeh from a captured image.

A patch method will be described first with reference to FIG. 5. In the patch method, local areas (hereinafter referred to as an image patch) 401a are cut out of the captured image 401.

In this case, for example, the entire area of the captured image 401 may be divided into areas arranged in a matrix. The divided areas may be cut out in sequence as image patches 401a, or the captured image 401 may be recognized and the image patches 401a may be cut out so as to cover the area where the subject (image) has been detected. Note that an image patch 401a may overlap with another image patch 401a.

In the patch method, a bokeh value is output as a prediction value corresponding to the image patches 401a cut out as described above. Specifically, in the patch method, a bokeh 402 caused in the subject included in each of the image patches 401a is predicted using each of the image patches 401a cut out of the captured image 401.

Figure 6:
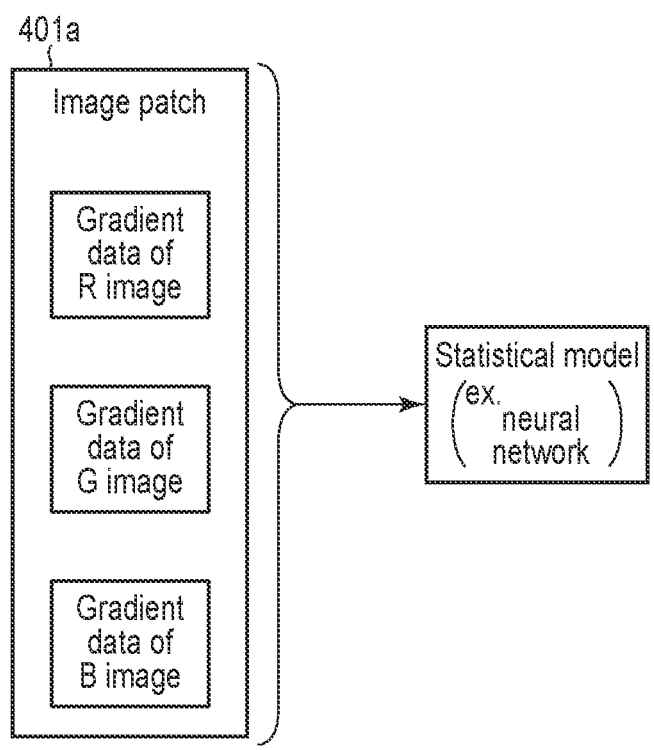
FIG. 6 is a diagram illustrating an example of information on an image patch.

FIG. 6 shows an example of information concerning an image patch 401a input to the statistical model in the patch method described above.

In the patch method, for each of R, G and B images included in the captured image 401, gradient data (gradient data of the R image, gradient data of the G image and gradient data of the B image) of the image patch 401a cut out of the captured image 401 is generated. The gradient data thus generated is input to the statistical model.

Note that the gradient data corresponds to a difference (difference value) in pixel value between a pixel and its adjacent pixel. For example, when an image patch 401a is extracted as a rectangular area of n pixels (in the X-axis direction)×m pixels (in the Y-axis direction), gradient data (that is, gradient data of each pixel) is generated in which a difference value between the pixels in the image patch 401a and, for example, their right-sided pixels are arranged in a matrix of n rows×m columns.

The statistical model uses the gradient data of the R image, that of the G image and that of the B image to predict a bokeh caused in the pixels. In the case of FIG. 6, the gradient data of each of the R, G and B images is input to the statistical model, but the gradient data of an RGB image may be input to the statistical model.

When the gradient data of each pixel is input to the statistical model in the patch method as described above, the statistical model outputs a bokeh value for each pixel.

Figure 7:
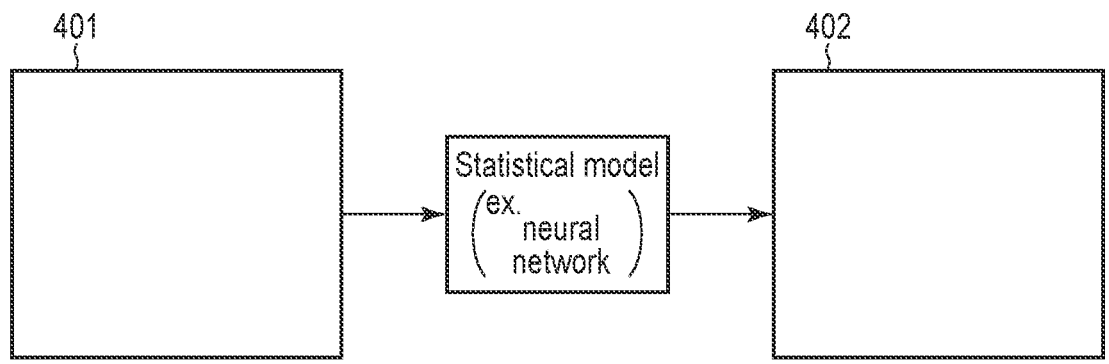
FIG. 7 is a diagram illustrating a screen batch method for predicting a bokeh from a captured image.

A screen batch method will be described below with reference to FIG. 7. In the screen batch method, the image patches 401a are not cut out.

In the screen batch method, the statistical model receives information concerning the entire area of the captured image 401 and outputs a bokeh value indicating a bokeh as a prediction value corresponding to the entire area. That is, in the screen batch method, a bokeh 402 corresponding to the distance to a subject included in the entire area of the captured image 401 is predicted using the entire area of the captured image 401.

Note that the information concerning the entire area input to the statistical model in the screen batch method is, for example, the gradient data of the R image, G image and B image (the gradient data of pixels constituting the R, G and B images) described above.

In the screen batch method, furthermore, the entire area of the captured image 401 is input to the statistical model and thus, context extracted from the captured image 401 (entire area) can be used for the prediction of the distance described above. Note that the context corresponds to an amount of characteristic regarding, for example, the distribution of line segments and colors in the captured image 401. The context also includes characteristics of a subject, such as the shape of a person and the shape of a building.

When the gradient data of each pixel is input to the statistical model in the screen batch method as described above, the statistical model outputs a bokeh value for each pixel.

In the first embodiment, as described above, it is possible to predict a bokeh (a bokeh value indicating a bokeh) caused in an image in accordance with the distance from the image to a subject included in the image, using a statistical model. In order to improve the accuracy of the bokeh value, it is necessary to cause the statistical model to learn.

An overview of a learning method of a general statistical model will be described below with reference to FIG. 8. In either of the patch method and the screen batch method described above, a statistical model is learned basically in the flow shown in FIG. 8. Specifically, the statistical model is learned by inputting information on an image (hereinafter referred to as a learning image) 501 prepared for the learning to the statistical model and feeding back an error between a bokeh value 502 output (predicted) from the statistical model and a correct value 503 to the statistical model. The correct value 503 is a bokeh value indicating a bokeh caused in the learning image 501 in accordance with the actual distance (measured value) from a capturing point of the learning image 501 to a subject included in the learning image 501 (the bokeh value is obtained by converting the actual distance), and is also referred to as a correct label, for example. The "feeding back" means updating the parameter (e.g., the weighting factor) of the statistical model so as to reduce the error.

Specifically, when the patch method is applied, for each image patch (local region) cut out of the learning image 501, information (gradient data) on the image patch is input to a statistical model, and a bokeh value 502 indicating a bokeh of each pixel corresponding to each image patch is output from the statistical model. The error obtained by comparing the output bokeh value 502 and the correct value 503 is fed back to the statistical model.

When the screen batch method is applied, information (gradient data) on the entire area of the learning image 501 is collectively input to a statistical model, and a bokeh value 502 indicating a bokeh of each pixel of the learning image 501 is output from the statistical model. An error obtained by comparing the bokeh value 502 and the correct value 503 is fed back to the statistical model.

Figure 8:
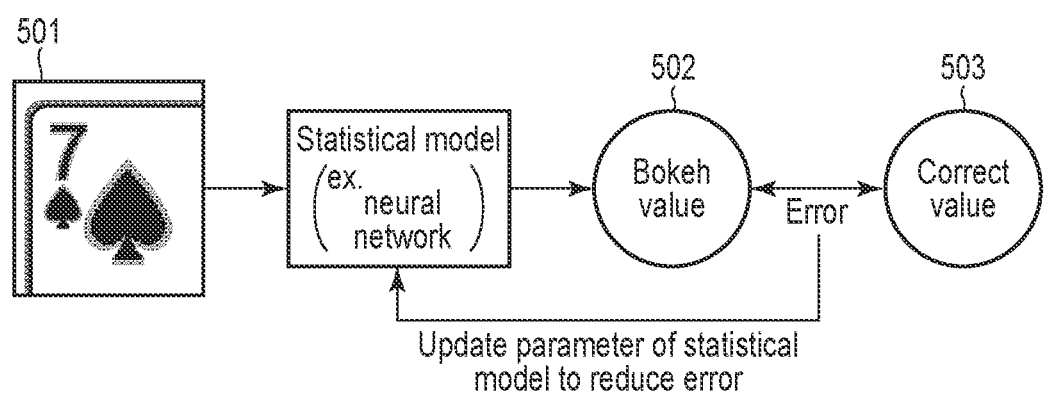
FIG. 8 is an illustration of an overview of a learning method of a general statistical model.

In order to cause a statistical model to learn, it is necessary to prepare a learning image (that is, a data set for learning includes a learning image and a correct value obtained by converting the actual distance to be acquired from the learning image) to which a correct value as described with reference to FIG. 8 is added. However, in order to obtain the correct value, it is necessary to measure the actual distance to a subject included in the learning image each time a learning image is captured, which is complicated. Also, in order to improve the accuracy of the statistical model, it is necessary to cause the statistical model to learn a large number of data sets for learning, but it is not easy to prepare such a large number of data sets for learning.

In order to prepare the foregoing data sets for learning relatively easily, a stage having a moving mechanism for moving (sliding) the capture device 2 in the horizontal direction as shown in FIG. 9 is used in an indoor environment (first domain) such as a laboratory. Accordingly, using a television monitor or the like having a planar shape as a subject, the subject is captured while moving the capture device 2 such that the distance between the subject and the capture device 2 has a predetermined value, with the result that a number of data sets for learning, which include a learning image including the subject and a distance to the subject, can be obtained as shown in FIG. 10.

However, when a bokeh (a bokeh value indicating a bokeh) is predicted from an image captured in an outdoor environment (second domain) using a statistical model generated by learning a bokeh caused in an image captured in an indoor environment as described above, an error occurs in the prediction due to a change in physical cues with a difference in environment (domain) in which the image is captured.

In this case, it is preferable to further learn the bokeh caused in the image captured in the outdoor environment, but it is difficult to obtain a data set for learning while measuring the actual distance to the subject in the outdoor environment.

Figure 11:
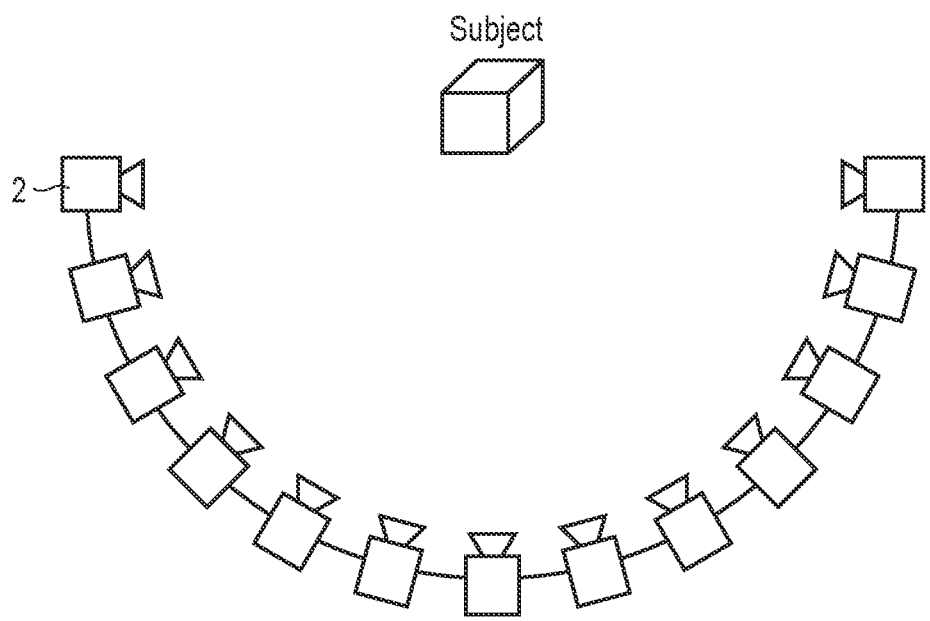
FIG. 11 is an illustration of a multi-view image.

Assume in the first embodiment that learning (relearning) of a statistical model, which requires no correct value, is achieved using a multi-view image captured by the capture device 2 in a domain (e.g., outdoor environment) to which the statistical model is applied. The multi-view image in the first embodiment refers to a plurality of images obtained by capturing the same subject from different viewpoints (that is, a multiple views) as shown in FIG. 11. Note that the multi-view image has only to include two or more images.

Figure 12:
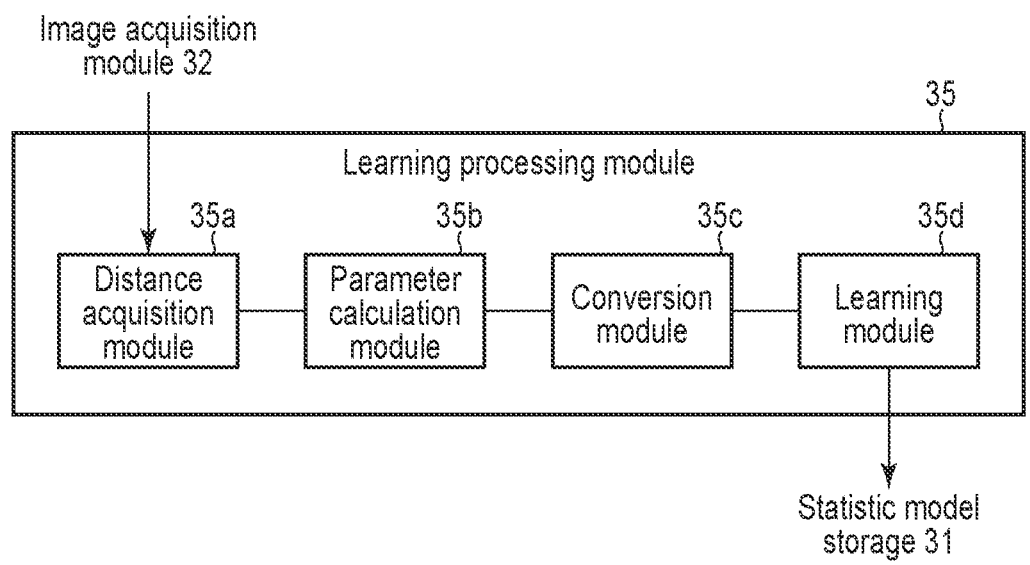
FIG. 12 is a block diagram showing an example of a functional configuration of a learning processing module.

Below is a specific description of the learning processing module 35 included in the image processing device 3 shown in FIG. 1. FIG. 12 is a block diagram showing an example of the functional configuration of the learning processing module 35.

As shown in FIG. 12, the learning processing module 35 includes a distance acquisition module 35a, a parameter calculation module 35b, a conversion module 35c and a learning module 35d.

First, in the first embodiment, when a statistical model (pre-learning statistical model) stored in the statistical model storage 31 is caused to learn, the image acquisition module 32 acquires the above-described multi-view image (a plurality of images obtained by capturing the same subject from multiple viewpoints), and the distance acquisition module 35a acquires the multi-view image from the image acquisition module 32. The distance acquisition module 35a acquires the distance (depth) from the acquired multi-view image to a second subject included in each image of the multi-view image. The distance acquired by the distance acquisition module 35a will be described in detail later.

Consider that the distance to the second subject acquired from the multi-view image is used as a correct value. However, the distance to the second subject acquired from the multi-view image has an indefinite scale, and an appropriate bokeh value (that is, a correct value) cannot be obtained from the distance unless a distance based on the actual scale is calculated from the indefinite scale distance, using a scale parameter, for example.

FIG. 13 specifically shows a correspondence between a bokeh (the size of a bokeh) and the distance calculated using a true scale parameter. If there is an error in the scale parameter (that is, if the scale parameter is indefinite and the actual-scale distance is calculated using a scale parameter with an error), a deviation occurs in the correspondence between the bokeh and the distance, as shown in FIG. 14. FIG. 14 shows a correspondence between a bokeh and the distance calculated using a scale parameter with an error versus a true scale parameter.

When a bokeh value converted from the distance calculated using the scale parameter with an error as shown in FIG. 14 is used as a correct value, the statistical model cannot perform high-quality leaning (in other words, the accuracy of the statistical model is likely to decrease).

In addition, when the distance is converted into a bokeh value as will be described later, it is necessary to use a camera parameter in the capture device 2, but the camera parameter is also indefinite, and an appropriate correct value (bokeh value) cannot be obtained.

In order to use the distance, which is obtained from the multi-view image captured in a domain to which the statistical model is applied, for learning, therefore, the foregoing indefinite parameter needs to be calculated.

The parameter calculation module 35b thus inputs each image of the multi-view image to a statistical model stored in the statistical model storage 31 (that is, a pre-learning statistical model which is stored in the statistical model storage 31 and which has pre-learned a bokeh caused in an image captured in, for example, an indoor environment) to obtain a bokeh value output from the statistical model.

The parameter calculation module 35b calculates the foregoing indefinite parameter (scale parameter and camera parameter) by matching (calibrating) the distance to the subject acquired by the distance acquisition module 35a and the bokeh value acquired by the parameter calculation module 35b, as described above.

The conversion module 35c converts the distance acquired by the distance acquisition module 35a into a bokeh value using the indefinite parameter calculated by the parameter calculation module 35b.

The learning module 35d causes the statistical model to learn the multi-view image and the bokeh value converted from the distance by the conversion module 35c. The statistical model whose learning is completed by the learning module 35d is stored in the statistical model storage 31 (that is, it is overwritten to the statistical model stored in the statistical model storage 31).

In the first embodiment, as described above, two indefinite parameters (indefinite scale parameter and indefinite camera parameter) existing between the multi-view image and the bokeh value are eliminated to achieve online learning using the multi-view image.

An example of a process of the image processing device 3 performed when the statistical model is caused to learn will be described with reference to the flowchart shown in FIG. 15.

Assume here that a statistical model (pre-learning statistical model) whose learning is completed in advance is stored in the statistical model storage 31 and the statistical model is generated by learning a bokeh caused in an image captured in the above-described indoor environment. Note that the statistical model stored in the statistical model storage 31 may be generated, for example, by learning a bokeh caused in an image captured by the capture device 2 or by learning a bokeh generated in an image captured by a capture device (or a lens) other than the capture device 2. That is, in the first embodiment, a statistical model has only to be prepared in advance to receive at least an image and output (predict) a bokeh value indicating a bokeh caused in the image in accordance with the distance to a subject included in the image.

First, the distance acquisition module 35a acquires a multi-view image acquired by the image acquisition module 32 (an image captured by the capture device 2) as a learning image (step S1). The multi-view image acquired in step S1 includes a plurality of images captured from different viewpoints (multiple views) of the same subject in an outdoor environment or the like (that is, a domain other than the indoor environment in which a bokeh is learned in advance). The multi-view image is preferably an image obtained by capturing the same subject as far as possible from different positions. Assume that in the first embodiment, each of the images included in the multi-view image is captured by the capture device 2 with a focus position fixed.

It should be noted that the capture device 2 that captures a multi-view image has only to be an optional camera system to which an optional lens is attached, and need not be a capture device that captures an image whose bokeh is learned in advance by the statistical model described above.

When the process of step S1 is performed, the distance acquisition module 35a acquires, from the multi-view image acquired in step S1, the distance to a subject included in each image of the multi-view image (a distance with an indefinite scale) (step S2).

Note that technologies called Structure from Motion (SfM) and multi-view stereo can be used to acquire the distance (estimate the depth) from the multi-view image in step S2.

Figure 16:
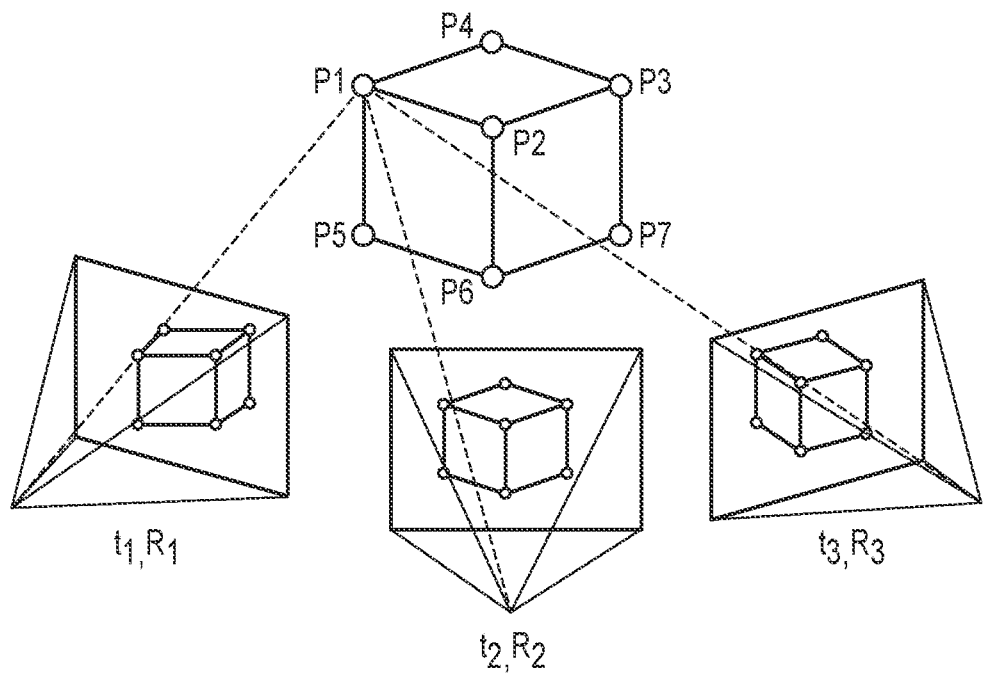
FIG. 16 is an illustration of an overview of SfM.

FIG. 16 shows an overview of the SfM. In the SfM, feature points of a subject (feature points representing the shape of the subject) are extracted from each of the images included in the multi-view image. FIG. 16 shows P1 to P7 extracted as feature points of the subject from three images. The feature points thus extracted are caused to correspond to each other among the images of the multi-view image. According to the SfM, the position and attitude of the capture device 2 when each learning image is captured (that is, the position and attitude of the capture device 2 in each viewpoint) can be calculated on the basis of (the coordinates of) a three-dimensional point group based on the feature points and displacement between the feature points. In the SfM, the use of the multi-view image makes it possible to minimize a deviation of the coordinates of the three-dimensional point group.

Assume in the first embodiment that the (coordinates of) three-dimensional point group is calculated in more detail by the multi-view stereo technology using the position and attitude of the capture device 2 in each viewpoint described above because the coordinates of a coarse three-dimensional point group are calculated in the SfM.

If, in the above case, the position (translation component) and the attitude (rotation component) of one viewpoint (capture device 2) in the foregoing SfM and multi-view stereo technology are defined as t and R, respectively, and the coordinates of the three-dimensional point calculated from the multi-view image is (X, Y, Z), the relationship between the coordinates (x, y) in the multi-view image (image in each viewpoint) and the distance (depth) $z_0$ to a subject located at the coordinates is given by the following expressions (1) and (2).

$$\begin{pmatrix} x' \\ y' \\ z_0 \end{pmatrix} = K[R \mid t] \begin{pmatrix} X \\ Y \\ Z \\ 1 \end{pmatrix} \quad \text{Expression (1)}$$

$$\begin{pmatrix} x \\ y \end{pmatrix} = \begin{pmatrix} \frac{x'}{z_0} \\ \frac{y'}{z_0} \end{pmatrix} \quad \text{Expression (2)}$$

In the expression (1), K is an internal parameter of the capture device 2 and includes, for example, a distance between the lens 21 and the image sensor 22 which are provided in the capture device 2.

In step S2, the distance to the subject in an image included in the multi-view image is calculated for each of the feature points using the above expressions (1) and (2).

The distance obtained (calculated) in step S2 is a distance $z_0$ with an indeterminate scale. The relationship between the distance $z_0$ with an indefinite scale and a distance z based on the actual scale is given by the following expression (3).

$$z = \beta z_0 \qquad \text{Expression (3)}$$

In the expression (3), $\beta$ is a scale parameter for converting the distance $z_0$ with an indefinite scale into the distance z based on the actual scale. Generally, when there is no information (prior information) concerning the size of the subject included in an image or information (value) obtained from another sensor, the scale parameter $\beta$ cannot be obtained only by the information of the capture device 2 (monocular camera).

Figure 17:
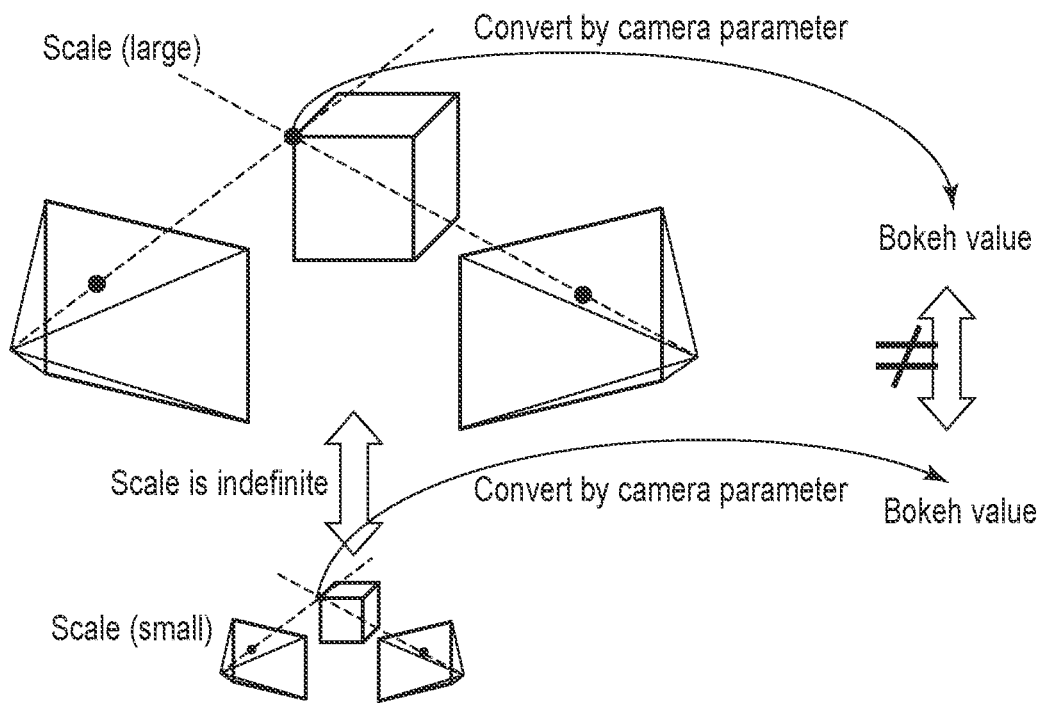
FIG. 17 is an illustration of the relationship between a scale parameter and a bokeh value.

When the statistical model is caused to learn, the bokeh value converted from the distance using the camera parameter is used as a correct value. However, when the scale parameter $\beta$ is thus indefinite, it may be converted into a different one, and the statistical model cannot be caused to learn properly, even though a subject existing, for example, at the same distance is imaged as shown in FIG. 17.

Returning to FIG. 15, the parameter calculation module 35b acquires a bokeh value (a prediction value of a bokeh) from the multi-view image acquired in step S1 using the statistical model stored in the statistical model storage 31 (step S3). In step S3, a bokeh value output from the statistical model is acquired by inputting each image of the multi-view image into the statistical model. Note that a partial area (e.g., an area including the subject) of each image of the multi-view image may be input to the statistical model.

When each image of the multi-view image is x and a statistical model with a parameter (e.g., weighting factor) $\theta$ is $f_\theta$, a bokeh value (prediction value) b output from the statistical model $f_\theta$ by inputting the image x to the statistical model $f_\theta$ is represented by the following expression (4).

$$b = f_\theta(x) \qquad \text{Expression (4)}$$

When the image x is input to the statistical model $f_\theta$ as described above, the statistical model $f_\theta$ outputs a bokeh value for each of the pixels constituting the image x as described above. Therefore, when the process of step S3 is performed, a bokeh value b corresponding to the distance $z_0$ acquired for each feature point extracted from each image of the multi-view image (that is, a bokeh value output for a pixel corresponding to the feature point) can be acquired.

Then, the parameter calculation module 35b calculates the foregoing indefinite parameters (scale parameters and camera parameters) (step S4). In step S4, an indefinite parameter is calculated based on the distance (indefinite-scale distance) obtained in step S2 and the bokeh value obtained in step S3.

The process of step S4 will be specifically described below. The relationship between the distance z based on the actual scale and the bokeh value b is represented by the following expression (5).

$$b = \frac{fv}{2pF}\left(\frac{1}{f} - \frac{1}{z} - \frac{1}{v}\right) \qquad \text{Expression (5)}$$

In the expression (5), f is a focal length, v is a distance between the lens 21 and the image sensor 22 which are provided in the capture device 2, p is a pixel pitch, and F is an aperture (value).

Figure 18:
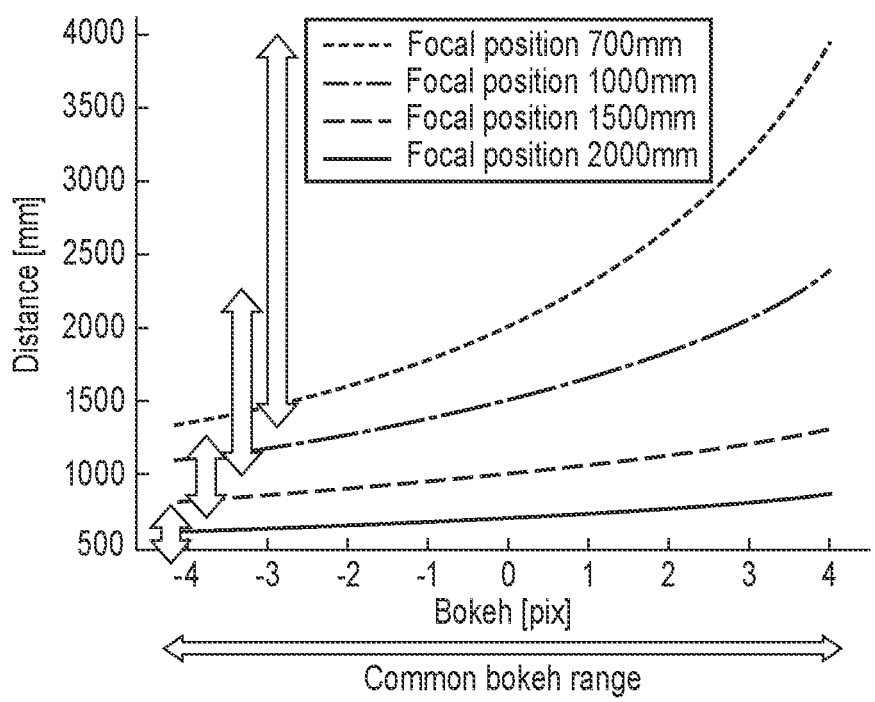
FIG. 18 is a graph showing a correspondence between the distance to a subject and a bokeh caused according to the distance for each focal position.

FIG. 18 shows a correspondence between the distance to a subject and a bokeh (the size of a bokeh) caused in accordance with the distance for each focus position (each focus position in the capture device 2). As shown in FIG. 18, even if a bokeh value (bokeh amount) is the same, the distance corresponding to the bokeh value varies according to the focus position.

This means that if the focus position is unknown, the distance cannot be appropriately converted into a bokeh value, and the focus is indefinite.

Figure 19:
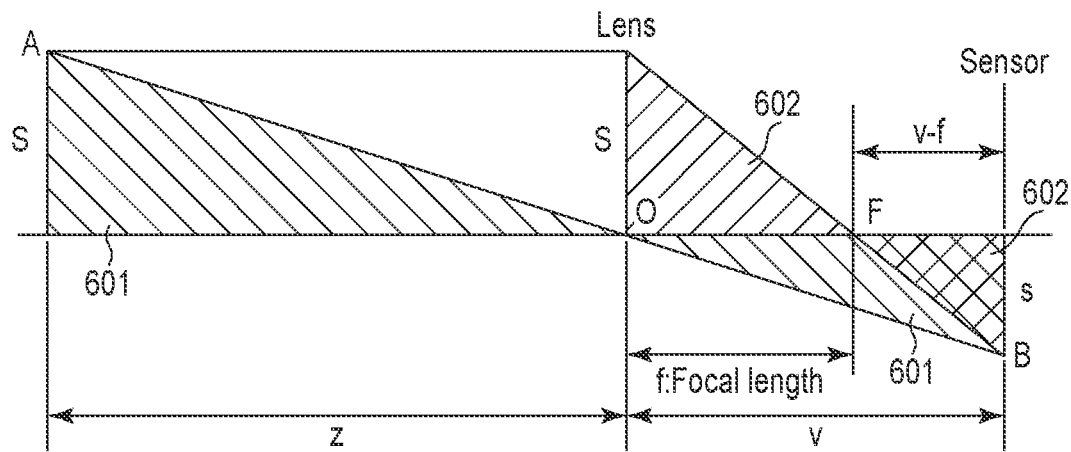
FIG. 19 is a diagram showing a perspective projection and a lens equation.

FIG. 19 is a diagram showing both the expression of a lens and the perspective projection used in the SfM and the like. The following expression (6) (perspective projection expression) can be obtained from the similarity of a triangular portion of a first area 601 shown in FIG. 19.

$$s = \frac{S}{z}v \qquad \text{Expression (6)}$$

The following expression (7) (expression of lens) can be derived from the similarity of a triangular portion of each of the first and second areas 601 and 602 shown in FIG. 19.

$$\frac{1}{f} = \frac{1}{z} + \frac{1}{v} \qquad \text{Expression (7)}$$

Assume here that, as described above, each image of the multi-view image in the first embodiment is captured by the capture device 2 with the focus position fixed, and the distance (focal length) v between the lens 21 and the image sensor 22 in the equation (6) is obtained in advance as an internal parameter of the capture device 2 in the SfM. The distance v in the expression (6) is the same as v in the expressions (5) and (7).

That is, the indefinite focus in the first embodiment means that the focal length f, which is a camera parameter, is indefinite.

Assume here that the other parameters (pixel pitch p and aperture F) in the expression (5) are obtained in advance in the same manner as the distance v between the lens 21 and the image sensor 22 described above.

Substituting the above expression (3) into the expression (5), the following expression (8) can be obtained.

$$b = \frac{fv}{2pF}\left(\frac{1}{f} - \frac{1}{\beta z_0} - \frac{1}{v}\right) \qquad \text{Expression (8)}$$

The expression (8) represents that the distance z0 with an indefinite scale is converted into a bokeh value by the parameters $\beta$ and f (scale and camera parameters), and can be given as the following expression (9).

$$b(z_0; \beta, f) = \frac{fv}{2pF}\left(\frac{1}{f} - \frac{1}{\beta z_0} - \frac{1}{v}\right) \qquad \text{Expression (9)}$$

The bokeh value b ($z_0$; $\beta$, f) obtained (calculated) for each of the feature points included in each of the multi-view images and converted from the distance $z_0$ with an indefinite scale should be equal to the bokeh value b (corresponding to the distance $z_0$) output from the statistical model. Thus, the problem of determining the scale and camera parameters β and f, which are indefinite parameters, results in a nonlinear regression problem as given by the following expression (10).

$$\beta', f' = \mathrm{argmin}_{\beta,f} \sum\nolimits_{b,z_0 \in N} l\left(b - \frac{fv}{2pF}\left(\frac{1}{f} - \frac{1}{\beta z_0} - \frac{1}{v}\right)\right) \quad \text{Expression (10)}$$

In the expression (10), N represents a set (the whole sample) of combinations of a distance with an indefinite scale (a distance acquired for each of the feature points included in the images of the multi-view image) $z_0$ and a bokeh value b corresponding to the distance, and l represents an optional distance function.

If, however, the scale parameter β and the camera parameter f are calculated using the above expression (10), non-linear regression problems in which a global solution is not guaranteed has to be solved. In the first embodiment, therefore, variable transformation is performed for the expression (10) to calculate the scale parameter β and the camera parameter f by the linear regression problems.

Consider first a least-square problem represented by the following expression (11) with the distance function in the expression (10) as an L2 norm.

$$\beta', f' = \mathrm{argmin}_{\beta,f} \sum\nolimits_{b,z_0 \in N} \left(b - \frac{fv}{2pF}\left(\frac{1}{f} - \frac{1}{\beta z_0} - \frac{1}{v}\right)\right)^2 \quad \text{Expression (11)}$$

Figure 20:
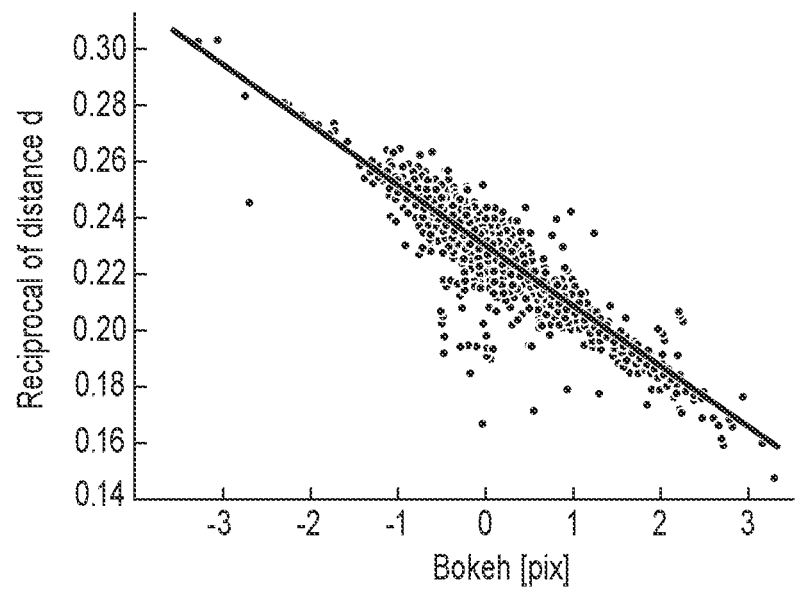
FIG. 20 is a graph showing an overview of linear regression problems for calculating scale and camera parameters.

Using the reciprocal d of the distance $z_0$ with an indefinite scale as a new variable to arrange the coefficients in the expression (11), the above nonlinear regression problems result in linear regression problems with the new variable as an unknown parameter, as given by the following expression (12) (see FIG. 20).

$$a_0', a_1' = \mathrm{arg\,min}_{a_0,a_1} \Sigma_{b,d \in N}(b - (a_0 + a_1 d))^2 \quad \text{Expression (12)}$$

The coefficient $a_0'$ in the expression (12) is defined as the following expression (13), and the coefficient $a_1'$ is defined as the following expression (14).

$$a_0' = \frac{v}{2pF} - \frac{f}{2pF} \quad \text{Expression (13)}$$

$$a_1' = -\frac{fv}{2pF\beta} \quad \text{Expression (14)}$$

Solving the above expressions (13) and (14) for the camera parameter f, the camera parameter f is given by the following expression (15) using the coefficient $a_0'$ in the expression (12).

$$f = v - 2pFa_0' \quad \text{Expression (15)}$$

Solving the above expressions (13) and (14) for the scale parameter β, the scale parameter β is given by the following expression (16) using the coefficient $a_1'$ in the expression (12) and the camera parameter f in the expression (15).

$$\beta = -\frac{fv}{2pFa_1'} \quad \text{Expression (16)}$$

In the first embodiment, the reciprocal of the distance $z_0$ to the subject included in each image of the multi-view image and the bokeh value b output from the statistical model by inputting the image into the statistical model are linearly regressed to obtain regression parameters (coefficients $a_0'$ and $a_1'$) using the above expression (12). Thus, the scale parameter β and the camera parameter f which are indefinite parameters can be calculated.

Returning to FIG. 15 again, the conversion module 35c converts the distance with an indefinite scale, which is obtained in step S2, into a bokeh value (step S5).

In step S5, the distance $z_0$ with an indefinite scale obtained in step S2 is converted into the bokeh value b by applying the distance $z_0$ with an indefinite scale, the predetermined parameters (distance v between the lens 21 and the image sensor 22, pixel pitch p, and aperture F), and the scale and camera parameters β and f calculated in step S4 to the expression (9).

In step S5, the distance obtained for each of the feature points included in the images of the multi-view image is converted into a bokeh value. Hereinafter, this bokeh value will be referred to as a bokeh value $b_{GT}$.

When the process of step S5 is performed, the learning module 35d uses the multi-view image acquired in step S1 and the bokeh value $b_{GT}$ converted from the distance in step S5 to cause the statistical model stored in the statistical model storage 31 to learn (to be updated) (step S6). In the learning of the statistical model, a loss function $L_\theta$ shown in the following expression (17) is used.

$$L(\theta) = \Sigma_{i \in N}(b_{GT}(i) - f_\theta(x(i)))^2 \quad \text{Expression (17)}$$

In the expression (17), N represents a set of feature points (pixels corresponding thereto) included in the images of the multi-view image for each of which the distance with an indefinite scale is obtained, and i represents one feature point (one pixel corresponding thereto) included in the set. In the expression (17), $b_{GT}(i)$ represents a bokeh value $b_{GT}$ converted from the distance with an indefinite scale obtained for the feature point i. In the expression (17), furthermore, $f_\theta(x(i))$ represents a bokeh value output from the statistical model for the pixel corresponding to the feature point i by inputting the image x including the feature point (pixel) i to the statistical model.

According to the above expression (17), an error (difference) between $b_{GT}(i)$ and $f_\theta(x(i))$ is calculated for each of the feature points (the pixels corresponding thereto) i to obtain the sum of the calculated errors. In the first embodiment, a parameter θ' of the statistical model in which the total of errors obtained by the expression (17) is minimized (that is, the updated parameter) is obtained by the following expression (18).

$$\theta' = \mathrm{arg\,min}_\theta L(\theta) \quad \text{Expression (18)}$$

When a neural network, a convolutional neural network or the like is applied to the statistical model of the first embodiment (in other words, when the statistical model includes a neural network, a convolutional neural network or the like), an error back propagation method for calculating the above expressions (17) and (18) in the reverse direction is used for learning of the statistical model (updating of the parameter θ). According to the error back propagation method, the gradient of loss is calculated, and the parameter θ is updated in accordance with the gradient.

In step S6, the statistical model updates the parameter θ of the statistical model to the parameter θ' obtained using the above expression (18). The statistical model can thus learn the multi-view image and the bokeh value $b_{GT}$.

In the first embodiment, using the bokeh value $b_{GT}$, which is converted from the distance with an indefinite scale using the scale and camera parameters β and f, as a correct value (teaching data), the statistical model is corrected to lessen a difference between the correct value and the bokeh value output from the statistical model. The statistical model for an application-destination domain (e.g., outdoor environment) can thus be improved in its accuracy.

The above expression (17) includes a loss function (L2 loss) using an L2 norm. For example, a loss function (L1 loss) using an L1 norm as included in the following expression (19), can be used.

$$L(\theta)=\Sigma_{i \in N}|b_{GT}(i)-f_{\theta}(x(i))| \quad \text{Expression (19)}$$

In the first embodiment, furthermore, a variety of loss functions can be used as long as they are used for regression, such as a loss function called a Huber loss. Also, a loss obtained by measuring an error between one image and another image may be utilized like, for example, a photometric loss (Zhou, Tinghui et al., "Unsupervised Learning of Depth and Ego-motion from video", Proceedings of the IEEE Conference on Computer Vision and Pattern Recognition, 2017).

In addition, for example, the statistical model may be constructed to output the degree of uncertainty (hereinafter referred to as uncertainty) for the bokeh value output from the statistical model (the bokeh value predicted in the statistical model) together with the bokeh value. In this case, a loss function that considers the uncertainty may be used.

An example of a process of the image processing device 3 in acquiring distance information from a captured image using a statistical model that is caused to learn by performing the process shown in FIG. 15, will be described below with reference to the flowchart of FIG. 21.

First, the capture device 2 (image sensor 22) captures an image of a subject to measure the distance from the capture device 2 to the subject to generate a captured image including the subject. The captured image is an image influenced by the aberration of the optical system (lens 21) of the capture device 2 as described above.

The image acquisition module 32 included in the image processing device 3 acquires the captured image from the capture device (step S11).

Then, the distance acquisition module 33 inputs information on the captured image acquired in step S11 to the statistical model stored in the statistical model storage 31 (step S12). Note that the information on the captured image input to the statistical model in step S12 includes gradient data of each of the pixels constituting the captured image.

When the process of step S12 is performed, a bokeh value indicating a bokeh caused in accordance with the distance to the subject is predicted in the statistical model, and the statistical model outputs the predicted bokeh value. The distance acquisition module 33 thus acquires the bokeh value from the statistical model (step S13). In step S13, a bokeh value for each of the pixels constituting the captured image acquired in step S11, is obtained.

When the process of step S13 is performed, the distance acquisition module 33 converts the bokeh value acquired in step S13 into a distance (step S14). In step S14, when the bokeh value obtained in step S13 is denoted by b and the distance to the subject is denoted by z, the distance from the bokeh value can be calculated using the above expression (5). As described above, the bokeh value is obtained for each of the pixels constituting the captured image in step S13 and thus the process of step S14 is performed for the bokeh value for each of the pixels. That is, in step S14, the bokeh value is converted into a distance for each of the pixels constituting the captured image. Assume that when the process of step S14 is performed, the parameters (focal length f of the capture device 2, distance v between the lens 21 and the image sensor, pixel pitch p, and aperture F) which are required to convert the bokeh value into a distance are determined in advance.

When the process of step S14 is performed, the output module 34 outputs distance information indicating the distance converted from the bokeh value in step S14 in the form of a map in positional correspondence with the captured image, for example (step S15). In the first embodiment, the distance information is output in the form of a map, but it may be output in another form.

According to the configuration in which the bokeh value output from the statistical model is converted into a distance as described above, by calibrating the distance at the time of the conversion, the image processing device can appropriately be adapted to the images captured in various environments and thus improved in its versatility.

As described above, in the first embodiment, a multi-view image (a plurality of second images) obtained by capturing the same subject from multiple viewpoints in a second domain (e.g., outdoor environment) different from a first domain (e.g., indoor environment) in which the pre-learning statistical model (the statistical model stored in the statistical model storage 31) has learned a bokeh in advance, is acquired, and the statistical model is caused to learn using the acquired multi-view image.

Specifically, the distance to a subject included in each of multi-view images is acquired from the multi-view image, the distance is converted into a bokeh value indicating a bokeh caused in accordance with the distance, and the bokeh value is learned by the statistical model.

With the foregoing configuration of the first embodiment, a multi-view image captured in an application-destination domain can be acquired (collected) to cause the statistical model to learn online. It is thus possible to improve the easiness of learning in the statistical model to obtain the distance to a subject.

Since the scale of the distance to the subject obtained from the multi-view image is indefinite, the distance cannot be used for learning of the statistical model as it is. In the first embodiment, however, each image of the multi-view image is input to the statistical model to match the distance to a subject included in each image thereof with a bokeh value output from the statistical model, with the result that a scale parameter (first parameter) for converting the distance into a distance based on the actual scale and an indefinite camera parameter (second parameter) are calculated in the capture device that has captured the multi-view image. The distance to the subject included in each image of the multi-view image (the distance with an indefinite scale) is converted into a bokeh value using the scale and camera parameters thus calculated.

In the first embodiment, the scale and camera parameters are calculated by linearly regressing the reciprocal of the distance to a subject included in each image of the multi-view image and a bokeh value output from a statistical model by inputting each image thereof into the statistical model.

In the first embodiment, as described above, even though the scale of the distance acquired from the multi-view image is indefinite, the distance is converted into an appropriate bokeh value, and the bokeh value is used as a correct value, with the result that the statistical model can perform a high-quality learning.

The first embodiment is directed to a configuration of causing a statistical model to learn using only a learning image (multi-view image) with no correct label (correct value). This learning is generally referred to as unsupervised learning. However, the first embodiment may employ semi-supervised learning in which a correct label is attached to part of the learning image (pixels constituting the learning image) (that is, a configuration of causing the statistical model to learn using a third image with the known distance to a subject).

Figure 15:
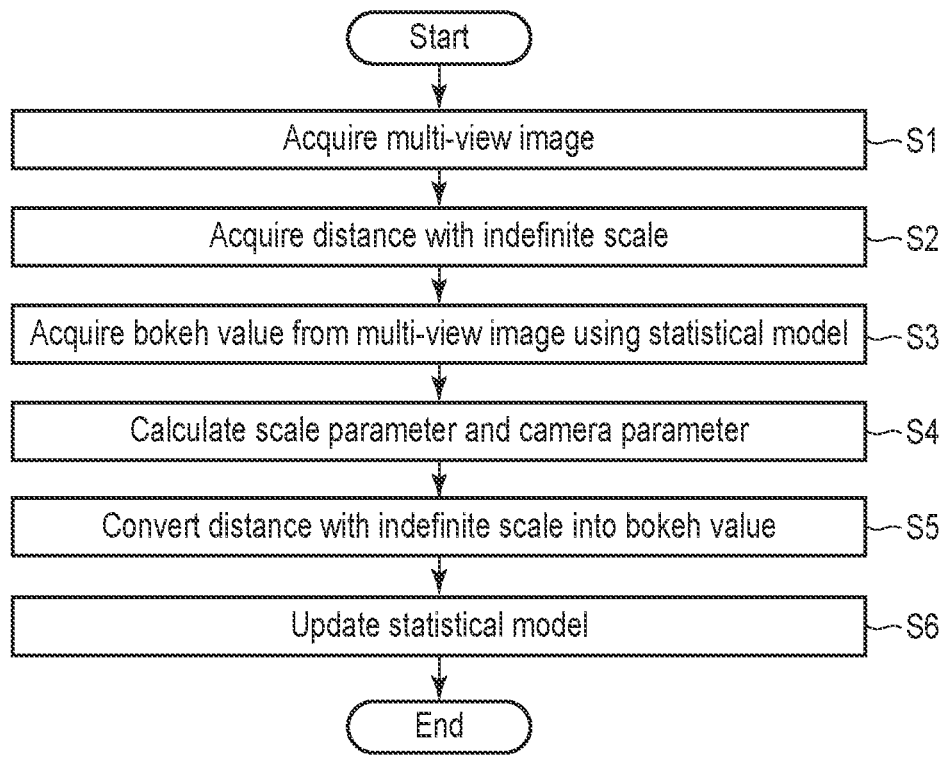
FIG. 15 is a flowchart showing an example of a process to be performed by the image processing device when a statistical model is learned.

Specifically, in step S5 shown in FIG. 15, the distance with an indefinite scale is converted into a bokeh value, but the bokeh value may be biased (learning bias) depending on the multi-view image acquired (collected) in step S1. It is conceived in this case that the bokeh value converted from the distance with an indefinite scale represents only a bokeh caused in a subject in front of the focus position or only a bokeh caused in a subject at the back of the focus position. If, however, when learning is performed only by such a bokeh value (data), it is impossible to adapt to a case where an image in which a bokeh different from the bokeh value (a bokeh indicated by the bokeh value) is caused is acquired as a captured image. The biased (unbalanced) learning can thus be eliminated using the above multi-view image simultaneously with a correct value (correct label) in which a bokeh value indicating a bokeh caused in a subject in front of the focus position and a bokeh value indicating a bokeh caused in a subject at the back of the focus position are collected in good balance.

The first embodiment has only to be configured to cause the statistical model to learn using a multi-view image as described above. The loss function and the like described above may be changed as appropriate.

The bokeh caused in an image due to the aberration of the optical system has a position dependency (the size and shape of the bokeh varies depending on the position on the image). In the first embodiment, however, the statistical model learns a bokeh converted from the distance obtained for the feature point (its corresponding pixel) extracted in the SfM. The statistical model may not efficiently learn a bokeh caused in an area including no feature point (that is, a subject). In this case, the multi-view image used for learning of the statistical model may be stored, and an area having a small number of feature points (e.g., an area where the number of the feature points is less than a predetermined value) may be output based on the distribution of feature points extracted from the multi-view image. With this configuration, for example, the user of the capture device 2 can be instructed (notified) to capture a multi-view image in which a subject is included in the output area, with the result that the statistical model can be caused to learn with efficiency. In addition, a multi-view image including feature points in the output area may be selected automatically to cause the statistical mode to learn using the selected multi-view image.

In the present embodiment, a statistical model is caused to learn so as to input an image including a subject and output a bokeh value indicating a bokeh caused in the image in accordance with a distance to the subject, and the bokeh value output from the statistical model is converted into a distance to acquire distance information. However, the statistical model may be caused to learn so as to input an image and output a distance to a subject included in the image. When the statistical model that outputs such a distance is caused to learn in the first embodiment, the distance to the subject obtained from the multi-view image (the distance with an indefinite scale) can be converted into the distance with the actual scale using the scale parameter β calculated in step S4 shown in FIG. 15, and the distance with the actual scale can be learned by the statistical model together with the multi-view image.

In the present embodiment, the statistical model is generated by learning an image influenced by the aberration of the optical system (a bokeh that is changed nonlinearly in accordance with the distance to a subject included in the image). However, it may be generated by learning an image formed based on light transmitted through a filter (e.g., a color filter) provided in the opening of the capture device 2 (a bokeh that is caused intentionally in the image by the filter and changed nonlinearly in accordance with the distance to the subject).

Second Embodiment

Next is a description of a second embodiment. The configuration and the like of a ranging system (a capture device and an image processing device) in the second embodiment are the same as those in the first embodiment described above. To describe the configuration of the ranging system of the second embodiment, FIG. 1 and the like are used as appropriate. The differences from the first embodiment will be mainly described.

In the first embodiment, a statistical model is caused to learn using a multi-view image (a set of multi-view images) captured in a single scene. The second embodiment differs from the first embodiment in that a statistical model is caused to learn using multi-view images (M sets of multi-view images) captured in M scenes, for example.

The scene in the second embodiment is a unit of a multi-view image captured by the capture device 2 in order to obtain a distance to a specific subject (a distance with an indefinite scale). Capturing a multi-view image in the M scenes includes capturing a multi-view image (a plurality of images) for each of M subjects, for example.

It is assumed in the second embodiment that the M sets of multi-view images are captured in a fixed focus state. In other words, it is assumed in the second embodiment that the sets of multi-view images have different scale parameters β but have the same camera parameter f.

An example of a process of the image processing device 3 performed when a statistical model is caused to learn in the second embodiment will be described below. For convenience, the description will be made with reference to FIG. 15.

First, the distance acquisition module 35a acquires, as learning images, M sets of multi-view images (images captured by the capture device 2) acquired by the image acquisition module 32 (step S1).

When the process of step S1 is performed, the distance acquisition module 35a acquires a distance (a distance with an indefinite scale) to the subject included in each of the M sets of multi-view images from the multi-view images acquired in step S1 (step S2).

In this case, the process of step S2 in the first embodiment has only to be performed for each set of multi-view images. Since the process of step S2 has been described in the first embodiment, its detailed description will be omitted.

In the second embodiment, a distance is determined (calculated) for each of the feature points included in each of the M sets of multi-view images. The sets of multi-view images (the scenes in which a multi-view image is captured) differ in a scale parameter for converting the distance into a distance based on the actual scale differs. In this case, the relationship between the distance $z_0$ obtained in step S2 and the distance z based on the actual scale is given by the following expression (20).

$$z = \beta_j z_0 \qquad \text{Expression (20)}$$

In the expression (20), $\beta_j$ (j=0, 1, . . . , M−1) is a scale parameter that is independent for each scene.

After the process of step S2, the process of step S3 is performed. The process of step S3 is similar to that in the first embodiment. In step 3 of the second embodiment, each of the M sets of multi-view images is input to the statistical model to acquire a bokeh value from the statistical model.

Then, the parameter calculation module 35b calculates indefinite parameters (scale parameter $\beta_j$ and camera parameter f) (step S4).

In the first embodiment, as described above, the indefinite parameters can be calculated in closed form from linear regression under the conditions of a single scene (scale parameter $\beta$ only) and fixed focus (camera parameter f only). When a multi-view image is captured in each of the (M) scenes as in the second embodiment, there is no closed-form solution unlike in the first embodiment because there are a plurality of scale parameters.

In the second embodiment, therefore, nonlinear regression problems are formulated as will be described below in order to calculate the scale parameter $\beta_j$ and the camera parameter f.

First, the following expression (21) for calculating a bokeh value b from the distance $z_0$ with an indefinite scale can be obtained from the foregoing expression (9).

$$b(z_0; \beta_j, f) = \frac{fv}{2pF}\left(\frac{1}{f} - \frac{1}{\beta_j z_0} - \frac{1}{v}\right) \qquad \text{Expression (21)}$$

The bokeh value b ($z_0$; $\beta_j$, f) obtained (calculated) for each of the feature points included in each of the M sets of multi-view images and converted from the distance $z_0$ with an indefinite scale should be equal to the bokeh value b (corresponding to the distance $z_0$) output from the statistical model. Thus, the problem of obtaining the indefinite scale and camera parameters $\beta_j$ and f results in nonlinear regression problems as given by the following expression (22).

$$\beta'_j, f' = \operatorname{argmin}_{\beta_j, f(j=0,\ldots,M-1)} \sum_j \sum_{b, z_0 \in N_j} l\left(b - \frac{fv}{2pF}\left(\frac{1}{f} - \frac{1}{\beta_j z_0} - \frac{1}{v}\right)\right) \qquad \text{Expression (22)}$$

In the expression (22), $N_j$ represents a set (the entire sample) of combinations of the distance $z_0$ with an indefinite scale, which is obtained for each of the feature points included in each of the multi-view images captured in scene j among the M scenes, and a bokeh value b corresponding to the distance $z_0$, and l represents an optional distance function.

The above expression (22) shows nonlinear optimization problems regarding the indefinite parameters (scale and camera parameters $\beta_j$ and f). When the distance function l in the expression (22) is the L2 norm, nonlinear least square problems as shown in the following expression (23) arise.

$$\beta'_j, f' = \operatorname{argmin}_{\beta_j, f(j=0,\ldots,M-1)} \sum_j \sum_{b, z_0 \in N_j} \left(b - \frac{fv}{2pF}\left(\frac{1}{f} - \frac{1}{\beta_j z_0} - \frac{1}{v}\right)\right)^2 \qquad \text{Expression (23)}$$

The above expression (23) can be solved by, for example, the Levenberg-Marquardt method (J. J. More, "The Levenberg-Marquardt Algorithm: Implementation and Theory", Numerical Analysis, ed. G. A. Watson, Lecture Notes in Mathematics 630, Springer Verlag, pp. 105-116, 1977). In addition to the Levenberg-Marquardt method, for example, the trust region reflective algorithm (M. A. Branch, T. F. Coleman, and Y. Li, "A Subspace, Interior, and Conjugate Gradient Method for Large-Scale Bound-Constrained Minimization Problems", SIAM Journal on Scientific Computing, Vol. 21, Number 1, pp 1-23, 1999) may be used. Further, as the foregoing distance function, a robust function as disclosed in "B. Triggs et al., "Bundle Adjustment—A Modern Synthesis", Proceedings of the International Workshop on Vision Algorithms: Theory and Practice, pp. 298-372, 1999" can be used.

As described above, in the second embodiment, the scale and camera parameters $\beta_j$ and f can be calculated by the nonlinear optimization based on the distance with an indefinite scale to a subject included in each of the M sets of multi-view images (the distance obtained for each feature point) and a bokeh value output from a statistical model by inputting each of the M sets of multi-view images to the statistical model.

Note that the nonlinear optimization problems provide a local solution, not a global solution. Accordingly, an error may become large depending on the initial values of the scale and camera parameters $\beta_j$ and f.

In the second embodiment, therefore, an initial value determined (calculated) using the linear regression problems described in the first embodiment is used.

Specifically, in the first embodiment, the scale and camera parameters $\beta_j$ and f can be calculated using the expressions (12), (15) and (16) for a set of multi-view images captured in a single scene. This calculation is performed for each of the sets of multi-view images (that is, scene j=0, 1, . . . , M−1). Thus, as described above, the scale and camera parameters $\beta$ and f are calculated by linearly regressing the reciprocal of the distance to a subject included in each of the multi-view images and a bokeh value output from a statistical model by inputting each of the multi-view images to the statistical model.

In this case, the average value of the camera parameters f (M camera parameters f) calculated for each scene j is determined as the initial value of the camera parameter f in the above expression (23). Note that the scale parameter $\beta$ calculated for each scene j is used as the initial value of the scale parameter $\beta_j$.

In the second embodiment, the scale and camera parameters $\beta_j$ and f are calculated by solving the nonlinear optimization problems (expression (23)) using the initial values of the scale and camera parameters $\beta_j$ and f thus determined (calculated).

When the initial values of the scale and camera parameters $\beta_j$ and f are used, solving the nonlinear optimization problems can inhibit a large error from being caused in the scale and camera parameters $\beta_j$ and f.

After the process of step S4, the processes of steps S5 and S6 are performed. Since the processes of steps S5 and S6 are similar to those in the first embodiment, their detailed descriptions will be omitted.

In step S5, the distance $z_0$ with an indefinite scale obtained in step S2 has only to be converted into a bokeh value b by applying the distance $z_0$ with an indefinite scale, predetermined parameters (distance v between the lens 21 and the image sensor 22, pixel pitch p, and aperture F), and the scale and camera parameters $\beta_j$ and f calculated in step S4 to the expression (21).

As described above, it is conceivable in the second embodiment that even when M multi-view images are captured, a statistical model is caused to learn using the scale and camera parameters $\beta_j$ and f (the scale and camera parameters $\beta_j$ and f calculated independently for each scene) calculated by performing the same process as in the first embodiment for each scene. With this configuration, however, camera parameters f, which vary from scene to scene, are calculated, and the constraint that the camera parameters f are fixed (common) is not reflected, with the result that the accuracy of learning is decreased. In the second embodiment, therefore, high-accuracy learning is achieved using the scale and camera parameters $\beta_j$ and f calculated by solving the nonlinear optimization problems.

Since the process of the image processing device 3 in obtaining distance information from a captured image is similar to that in the first embodiment, its detailed description will be omitted.

As described above, in the second embodiment, the scale and camera parameters $\beta_j$ and f (first and second parameters) are calculated by nonlinear optimization based on the distance to a subject included in each of the M sets of multi-view images (a plurality of second images) and a bokeh value output from a statistical model (pre-learning statistical model) by inputting each of the multi-view images to the statistical model.

With the foregoing configuration of the second embodiment, even when multi-view images are captured in a plurality of scenes (e.g., M scenes) in an application-destination domain, the captured multi-view images can be acquired (collected) to cause the statistical model to learn online. Learning can thus be more improved in easiness and efficiency than, for example, learning performed for each of the multi-view images captured in a single scene.

In the second embodiment, furthermore, the initial values of the scale and camera parameters $\beta_j$ and f are calculated by performing the process described in the first embodiment (by linearly regressing the reciprocal of the distance with an indefinite scale and a bokeh value output from a statistical model by inputting each of the multi-view images to the statistical model), and the scale and camera parameters $\beta_j$ and f are calculated using the calculated initial values. This configuration makes it possible to reduce errors of the scale and camera parameters $\beta_j$ and f and thus improve the accuracy of learning.

Third Embodiment

Next is a description of a third embodiment. The configuration and the like of a ranging system (a capture device and an image processing device) in the third embodiment are the same as those in the first embodiment described above. To describe the configuration of the ranging system of the third embodiment, FIG. 1 and the like are used as appropriate. The differences from the first embodiment will be mainly described.

In the first embodiment, a statistical model is caused to learn using a multi-view image captured in a fixed focus state. The third embodiment differs from the first embodiment in that a statistical model is caused to learn using multi-view images (K images) captured while focus is varied by, for example, an autofocus function.

It is assumed in the third embodiment that the multi-view images are captured in a single scene. In other words, it is assumed in the third embodiment that the multi-view images have the same scale parameter $\beta$ and different camera parameters f.

An example of a process of the image processing device 3 performed when a statistical model is caused to learn in the third embodiment will be described below. For convenience, the description will be made with reference to FIG. 15.

First, the distance acquisition module 35a acquires, as learning images, multi-view images (images captured by the capture device 2) acquired by the image acquisition module 32 (step S1). Note that the multi-view images acquired in step S1 are K images.

When the process of step S1 is performed, the distance acquisition module 35a acquires a distance (a distance with an indefinite scale) to the subject included in each of the multi-view images from the multi-view images acquired in step S1 (step S2).

Since the process of step S2 has been described in the first embodiment, its detailed description will be omitted.

After the process of step S2, the process of step S3 is performed. Since the process of step S3 is similar to that in the first embodiment, its detailed description will be omitted.

Then, the parameter calculation module 35b calculates indefinite parameters (scale parameter $\beta$ and camera parameter $f_k$) (step S4). The camera parameter $f_k$ (k=0, 1, ..., K−1) is the focal length of the image device 2 when an image k is captured among the multi-view images (K images) captured while varying the focus.

In the first embodiment described above, the indefinite parameters can be calculated in closed form from linear regression under the conditions of a single scene (scale parameter $\beta$ only) and fixed focus (camera parameter f only). When multi-view images are captured while varying the focus as in the third embodiment, there is no closed-form solution unlike in the first embodiment because the multi-view images have different camera parameters f (that is, there are a plurality of camera parameters).

When the focus is changed by the autofocus function as described above, the distance v between the lens 21 and the image sensor 22 and the camera parameter f vary with an image, but it is assumed that the distance v can be obtained for each image as an internal parameter of the capture device (camera) 2.

In the present embodiment, therefore, the nonlinear regression problem is formulated as will be described below in order to calculate the scale and camera parameters $\beta$ and $f_k$.

First, the following expression (24) for obtaining a bokeh value b from the distance with an indefinite scale, can be obtained from the above expression (9).

$$b(z_0; \beta, f_k) = \frac{f_k v}{2pF}\left(\frac{1}{f_k} - \frac{1}{\beta z_0} - \frac{1}{v}\right) \qquad \text{Expression (24)}$$

The bokeh value b ($z_0$; $\beta$, $f_k$) obtained (calculated) for each of the feature points included in each of the multi-view images and converted from the distance $z_0$ with an indefinite scale should be equal to the bokeh value b (corresponding to the distance $z_0$) output from the statistical model. Thus, the problem of determining the scale and camera parameters $\beta$ and $f_k$, which are indefinite parameters, results in the nonlinear regression problem as given by the following expression (25).

$$\beta', f_k' = \mathrm{argmin}_{\beta, f_k(k=0,\ldots,K-1)} \sum_k \sum_{b, z_0 \in N_k} l\left(b - \frac{f_k v}{2pF}\left(\frac{1}{f} - \frac{1}{\beta z_0} - \frac{1}{v}\right)\right) \quad \text{Expression (25)}$$

In the expression (25), $N_k$ represents a set (the whole sample) of combinations of a distance $z_0$ with an indefinite scale, which is acquired for each of the feature points included in one image k of the K images (multi-view images), and a bokeh value b corresponding to the distance $z_0$, and l represents an optional distance function.

The above expression (25) shows nonlinear optimization problems regarding the indefinite parameters (scale and camera parameters $\beta_j$ and $f_k$). When the distance function l in the expression (25) is the L2 norm, nonlinear least square problems as shown in the following expression (26) arise.

$$\beta', f_k' = \mathrm{argmin}_{\beta, f_k(k=0,\ldots,K-1)} \sum_k \sum_{b, z_0 \in N_k} \left(b - \frac{f_k v}{2pF}\left(\frac{1}{f} - \frac{1}{\beta z_0} - \frac{1}{v}\right)\right)^2 \quad \text{Expression (26)}$$

The above expression (26) can be solved by, for example, the Levenberg-Marquardt method described above. In addition to the Levenberg-Marquardt method, for example, the trust region reflective algorithm may be used. Further, as the foregoing distance function, a robust function can be used.

As described above, in the third embodiment, the scale and camera parameters $\beta_j$ and $f_k$ can be calculated by the nonlinear optimization based on the distance with an indefinite scale to a subject included in each of the multi-view images (K images) (the distance obtained for each feature point) and a bokeh value output from a statistical model by inputting each of the multi-view images to the statistical model.

Note that the nonlinear optimization problems provide a local solution, not a global solution. Accordingly, an error may become large depending on the initial values of the scale and camera parameters $\beta_j$ and $f_k$.

In the third embodiment, therefore, an initial value determined (calculated) using the linear regression problems described in the first embodiment is used.

Specifically, in the first embodiment, the scale and camera parameters $\beta_j$ and f can be calculated using the expressions (12), (15) and (16) for a set of multi-view images captured in a single scene. This calculation is performed for each of the multi-view images (K images). Thus, as described above, the scale and camera parameters $\beta$ and f are calculated by linearly regressing the reciprocal of the distance to a subject included in each of the multi-view images and a bokeh value output from a statistical model by inputting each of the multi-view images to the statistical model.

In this case, the average value of the scale parameters $\beta$ (K scale parameters $\beta$) calculated for each image k is determined as the initial value of the scale parameter $\beta$ in the above expression (24). Note that the camera parameter f calculated for each image k is used as the initial value of the camera parameter $f_k$.

In the third embodiment, the scale and camera parameters $\beta$ and $f_k$ are calculated by solving the nonlinear optimization problems (expression (26)) using the initial values of the scale and camera parameters $\beta$ and $f_k$ thus determined (calculated).

When the initial values of the scale and camera parameters $\beta$ and $f_k$ are used, solving the nonlinear optimization problems can inhibit a large error from being caused in the scale and camera parameters $\beta$ and $f_k$.

After the process of step S4, the processes of steps S5 and S6 are performed. Since the processes of steps S5 and S6 are similar to those in the first embodiment, their detailed descriptions will be omitted.

In step S5, the distance $z_0$ with an indefinite scale obtained in step S2 has only to be converted into a bokeh value b by applying the distance $z_0$ with an indefinite scale, predetermined parameters (distance v between the lens 21 and the image sensor 22, pixel pitch p, and aperture F), and the scale and camera parameters $\beta$ and $f_k$ calculated in step S4 to the expression (24).

As described above, it is conceivable in the third embodiment that even when multi-view images (K images) are captured using the autofocus function, a statistical model is caused to learn using the scale and camera parameters $\beta$ and f (the scale and camera parameters $\beta$ and f calculated independently for each image) calculated by performing the same process as in the first embodiment for each image. With this configuration, however, scale parameters $\beta$, which vary from image to image, are calculated, and the constraint that the scale parameters $\beta$ are fixed (common) is not reflected, with the result that the accuracy of learning is decreased. In the third embodiment, therefore, high-accuracy learning is achieved using the scale and camera parameters $\beta$ and $f_k$ calculated by solving the nonlinear optimization problems.

Since the process of the image processing device 3 in obtaining distance information from a captured image is similar to that in the first embodiment, its detailed description will be omitted.

As described above, in the third embodiment, the scale and camera parameters $\beta$ and $f_k$ (first and second parameters) are calculated by nonlinear optimization based on the distance to a subject included in each of the multi-view images (K images) and a bokeh value output from a statistical model (pre-learning statistical model) by inputting each of the multi-view images to the statistical model.

With the foregoing configuration of the third embodiment, even when multi-view images are captured while varying the focus by the autofocus function, etc., in an application-destination domain, the captured multi-view images can be acquired (collected) to cause the statistical model to learn online. Learning can thus be more improved in easiness and efficiency than, for example, learning multi-view images captured in a fixed focus state, for example.

In the third embodiment, furthermore, the initial values of the scale and camera parameters $\beta$ and $f_k$ are calculated by performing the process described in the first embodiment (by linearly regressing the reciprocal of the distance with an indefinite scale and a bokeh value output from a statistical model by inputting each of the multi-view images to the statistical model), and the scale and camera parameters $\beta$ and $f_k$ are calculated using the calculated initial values. This configuration makes it possible to reduce errors of the scale and camera parameters $\beta$ and $f_k$ and thus improve the accuracy of learning.

At least one of the embodiments described above provides a learning method, a program, and an image processing device, which are capable of improving the easiness of learning in a statistical model to obtain the distance to a subject.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning method for causing a statistical model to learn, the statistical model being generated by learning a bokeh caused in a first image captured in a first domain in accordance with a distance to a first subject included in the first image, the method comprising:
    acquiring a plurality of second images by capturing a second subject from multiple viewpoints in a second domain other than the first domain; and
    causing the statistical model to learn using the second images.

2. The learning method of claim 1, further comprising:
    obtaining a distance to the second subject from each of the second images; and
    converting the distance obtained from each of the second images into a bokeh value indicating a bokeh caused in accordance with the distance to the second subject,
    wherein the causing the statistical model to learn comprises causing the statistical model to learn the second images and the bokeh value.

3. The learning method of claim 2, further comprising calculating,
    wherein:
    the distance obtained from each of the second images is a distance with an indefinite scale;
    the calculating comprises matching the distance obtained from each of the second images with a bokeh value output from the statistical model by inputting each of the second images to the statistical model to calculate a first parameter for converting the distance into a distance based on an actual scale and a second parameter that is indefinite in a capture device that has captured the second images; and
    the converting comprises converting the distance obtained from each of the second images into a bokeh value indicating a bokeh caused in accordance with the distance, using the first parameter and the second parameter.

4. The learning method of claim 3, wherein the calculating comprises calculating the first parameter and the second parameter by linearly regressing a reciprocal of the distance obtained from each of the second images and a bokeh value output from the statistical model by inputting each of the second images to the statistical model.

5. The learning method of claim 3, wherein the calculating comprises calculating the first parameter and the second parameter by nonlinear optimization based on the distance obtained from each of the second images and a bokeh value output from the statistical model by inputting each of the second images to the statistical model.

6. The learning method of claim 5, wherein the calculating includes calculating initial values of the first parameter and the second parameter by linearly regressing a reciprocal of the distance obtained from each of the second images and a bokeh value output from the statistical model by inputting each of the second images to the statistical model, and calculating the first parameter and the second parameter using the initial values.

7. The learning method of claim 2, further comprising:
    extracting a feature point of the second subject included in each of the second images; and
    outputting an area in which the number of feature points of the second subject is less than a predetermined value in each of the second images,
    wherein the obtaining the distance comprises obtaining a distance to the second subject for each of the feature points of the second subject.

8. The learning method of claim 1, further comprising acquiring a third image with a known distance from the third image to a third subject,
    wherein the causing the statistical model to learn comprises causing the statistical model to learn using the second images and the third image.

9. A non-transitory computer-readable storage medium having stored thereon a computer program which is executable by a computer and causes a statistical model to learn, the statistical model being generated by learning a bokeh caused in a first image captured in a first domain in accordance with a distance to a first subject included in the first image, the computer program comprising instructions capable of causing the computer to execute functions of:
    acquiring a plurality of second images by imaging a second subject from multiple viewpoints in a second domain other than the first domain; and
    causing the statistical model to learn the bokeh using the second images.

10. An image processing device which causes a statistical model to learn, the statistical model being generated by learning a bokeh caused in a first image captured in a first domain in accordance with a distance to a first subject included in the first image, the device comprising a processor configured to:
    acquire a plurality of second images by imaging a second subject from multiple viewpoints in a second domain other than the first domain; and
    cause the statistical model to learn the bokeh using the second images.

* * * * *